United States Patent
Yoon

(10) Patent No.: US 8,682,804 B1
(45) Date of Patent: Mar. 25, 2014

(54) RENTAL METHOD AND SYSTEM AMONG MULTIPLE PARTIES

(76) Inventor: Hyoungsoo Yoon, Sunnyvale, CA (US)

( * ) Notice: Subject to any disclaimer, the term of this patent is extended or adjusted under 35 U.S.C. 154(b) by 1197 days.

(21) Appl. No.: 11/533,351

(22) Filed: Sep. 19, 2006

Related U.S. Application Data

(60) Provisional application No. 60/719,402, filed on Sep. 21, 2005, provisional application No. 60/825,138, filed on Sep. 10, 2006.

(51) Int. Cl.
| | | |
|---|---|---|
| *G06Q 10/00* | (2012.01) | |
| *G06Q 50/00* | (2012.01) | |
| *G06F 17/00* | (2006.01) | |
| *G06G 7/00* | (2006.01) | |

(52) U.S. Cl.
USPC ............ 705/307; 705/1.1; 705/311; 705/313; 705/400

(58) Field of Classification Search
USPC ........ 705/1.1, 7.11–7.35, 5–6, 26.1–26.4, 30, 705/307, 311–314, 348; 235/1 R
See application file for complete search history.

(56) References Cited

U.S. PATENT DOCUMENTS

| | | | |
|---|---|---|---|
| 5,289,369 A | | 2/1994 | Hirshberg |
| 5,500,793 A | | 3/1996 | Deming, Jr. et al. |
| 5,715,169 A | | 2/1998 | Noguchi |
| 5,794,207 A | * | 8/1998 | Walker et al. ............ 705/1 |
| 5,812,070 A | | 9/1998 | Tagami et al. |
| 5,873,071 A | | 2/1999 | Ferstenberg et al. |
| 6,131,087 A | | 10/2000 | Luke et al. |
| 6,202,051 B1 | | 3/2001 | Woolston |
| 6,272,474 B1 | | 8/2001 | Garcia |
| 6,334,118 B1 | | 12/2001 | Benson |
| 6,336,100 B1 | | 1/2002 | Yamada |
| 6,484,153 B1 | * | 11/2002 | Walker et al. ............ 705/38 |
| 6,493,683 B1 | | 12/2002 | David et al. |
| 6,584,450 B1 | | 6/2003 | Hastings et al. |
| 6,594,640 B1 | * | 7/2003 | Postrel ............ 705/14 |
| 6,615,187 B1 | | 9/2003 | Ashenmil et al. |
| 6,654,547 B1 | | 11/2003 | Maeda et al. |
| 6,842,739 B2 | | 1/2005 | Postrel |
| 6,847,938 B1 | | 1/2005 | Moore |
| 6,850,901 B1 | | 2/2005 | Sykes et al. |
| 6,876,982 B1 | | 4/2005 | Lancaster |
| 6,876,983 B1 | | 4/2005 | Goddard |
| 6,885,998 B1 | | 4/2005 | Arduino |
| 6,904,410 B1 | | 6/2005 | Weiss et al. |
| 6,907,402 B1 | | 6/2005 | Khaitan |
| 6,912,510 B1 | | 6/2005 | Shepherd |
| 6,915,276 B2 | | 7/2005 | Foster et al. |
| 6,928,441 B2 | | 8/2005 | Haegele |

(Continued)

*Primary Examiner* — John Hayes
*Assistant Examiner* — George Chen

(57) ABSTRACT

A method and apparatus for coordinating and managing renting of items among multiple parties. Participants of the system interact with others at a central server connected via a communications network. According to an embodiment, each participant plays a role of a potential lender, a potential renter, or both. As the items of a participant get rented more, the system rewards him so that he is able to rent more himself. In a certain embodiment, a point value system is used. The server computer maintains all required information as to which items are currently for rent (e.g., offers) and which items are currently being requested (e.g., bids), as well as all data pertinent to rentable items and participants. A rental transaction occurs when a certain preset criterion is met, and point values are adjusted at the beginning, at the end and/or in the middle of the rental period.

12 Claims, 24 Drawing Sheets

(56) References Cited

U.S. PATENT DOCUMENTS

| | | |
|---|---|---|
| 6,934,690 B1 | 8/2005 | Van Horn et al. |
| 6,938,006 B2 | 8/2005 | Ikeda |
| 7,028,003 B2 | 4/2006 | Senker |
| 7,069,308 B2 | 6/2006 | Abrams |
| 7,080,030 B2 | 7/2006 | Eglen et al. |
| 7,085,727 B2 | 8/2006 | VanOrman |
| 7,091,882 B2 | 8/2006 | Doyle |
| 2001/0037280 A1* | 11/2001 | Ingraham et al. ............... 705/37 |
| 2002/0010602 A1 | 1/2002 | Tamai |
| 2002/0023037 A1* | 2/2002 | White, Jr. ........................ 705/37 |
| 2002/0062277 A1* | 5/2002 | Foster et al. .................... 705/38 |
| 2002/0069118 A1* | 6/2002 | Zylstra ........................... 705/26 |
| 2004/0006497 A1* | 1/2004 | Nestor et al. ..................... 705/5 |
| 2004/0172275 A1 | 9/2004 | Gross |
| 2005/0027616 A1* | 2/2005 | Jones et al. ..................... 705/26 |
| 2005/0060210 A1 | 3/2005 | Levi et al. |
| 2005/0182671 A1 | 8/2005 | Miyauchi |
| 2005/0192829 A1 | 9/2005 | Zandt et al. |
| 2005/0197855 A1 | 9/2005 | Nudd |
| 2006/0129467 A1 | 6/2006 | Chu et al. |

\* cited by examiner

RENTAL METHOD AND SYSTEM AMONG MULTIPLE PARTIES

CROSS REFERENCE TO RELATED APPLICATIONS

The present application claims priority to U.S. Provisional Patent Application No. 60/719,402 filed on Sep. 21, 2005 and entitled "Multi-Party Rental System" and U.S. Provisional Patent Application No. 60/825,138 filed on Sep. 10, 2006 and entitled "Method and Apparatus for Rental Coordination and Management", each of which is incorporated herein by reference in its entirety; this application hereby claims the benefit of these provisional applications under 35 U.S.C. §119 (e).

BACKGROUND OF THE INVENTION

1. Field of the Invention

The present invention generally relates to electronic commerce. More particularly, the invention pertains to methods, systems, and apparatuses for coordinating and managing rental transactions.

2. Description of the Related Art

Commercial trading and exchange systems have become more sophisticated and more powerful in recent years. This is partly due to recent advances in digital information processing infrastructures, in particular, due to wide availability of personal computers and global data communications networks such as the Internet. In fact, electronic commerce, or e-commerce, has become a vital component of modern economy. Millions of trades occur on Internet-based auction systems such as eBay every day, for instance, and many traditional mercantile exchanges or exchanges for financial instruments have been augmented or replaced by their electronic counterparts. Modern electronic commerce systems span basically all areas of consumer-to-consumer (C2C), business-to-consumer (B2C), and business-to-business (B2B) transactions.

One area, however, that has been slow in adopting this electronic commerce revolution is a rental industry (e.g., rental of goods, services, etc.). Even though many aspects of the business have been computerized in recent years, the basic business model remains the same. For example, you can make a reservation on the Web to rent an automobile. However, in essence, this is not very different from making reservations using telephones. One notable exception is on-line DVD rental business pioneered by Netflix and now adopted by many companies such as Blockbuster or Walmart, etc. Netflix, for example, do not charge rental fees per items. Rather, their business is based on membership fees. A certain membership level entitles a subscriber to a certain right as to how many items he or she can rent and/or hold at any given moment.

Traditional, as well as new online-type, rental businesses deal with a set of well-defined item types, and they are interfaced with two "actors" (in UML jargon). Namely, an item provider/lender (e.g., a rental business) and one or more renters/borrowers. Typically, the item provider and a renter enter into a contract which grants the renter a right to use a certain item(s) of a specified type for a certain period of time in exchange, for example, for a fee. At least one embodiment of the present invention generalizes this to rental between multiple providers and multiple renters. Some or all parties can be both providers and renters at the same time. One such example is a sports or recreation club, or a movie club, where members can lend and borrow items such as DVD movie titles among one another.

In order for a multi-party rental or exchange system to work, it may require mediators like stock exchanges. It is particularly so when the number of parties and/or the number of rental item types grow, thereby increasing the complexity of the system. It should also be noted that many functions performed by the item provider in traditional rental business may be delegated to other entities such as the mediator/exchange since there may be multiple item providers. Multi-party rental systems share many similar characteristics with traditional exchange-based trading systems. In particular, they share the same difficulties of matching offers and bids and setting trading/rental prices and the like. In the context of the multi-party rental system, the problem in designing such systems can be summarized, among other things, as follows:

Difficulty of a renter in finding a provider with a desired item (e.g., with mutually agreeable terms, etc.), and vice versa, Difficulty in setting a proper rental "price" for an item (or, for an item type), or more generally, in estimating a proper value of a rental transaction, Difficulty in matching providers and renters efficiently so that there is enough liquidity in the system, and Difficulty in tracking rented items, etc.

Various embodiments of the present invention address one or more of these issues. Accordingly, it is an object of the present invention to provide an improved system and method for rental of items (goods or services, etc.). It is a further object of the present invention to provide a system and method for item rental that can be implemented between multiple providers and multiple renters. It is another object of the present invention to provide a system and process to coordinate item rentals among multiple parties. It is yet another object of the present invention to provide a method and system for facilitating matching, bargaining, and contracting between multiple participants whose renting/offering and requesting items are separated in terms of rental times and geographical locations. It is yet another object of the present invention to provide a method and system for finding an item provider for a given item type. It is yet another object of the present invention to provide a method and system for listing and browsing available items and requested/demanded items. It is yet another object of the present invention to provide a method and system for automatically matching providers and renters for a given set of item types. It is yet another object of the present invention to provide an automated method and system for facilitating negotiations between multiple parties. It is yet another object of the present invention to provide a computerized system for setting rental prices and other contractual terms without explicit intervention of relevant parties. It is yet another object of the present invention to provide a secure system for providing market summaries or indicators regarding rental item supplies and demands. It is yet another object of the present invention to provide a system and method for providing anonymity and security to participants of a multi-party or mutual rental system. It is yet another object of the present invention to provide an automatic system which facilitates and ensures the liquidity of a rental system. Further objects and advantages will become apparent from a consideration of the ensuing description and drawings.

BRIEF SUMMARY OF EXEMPLARY EMBODIMENTS

At least one embodiment of the present invention is directed to an automated system and method for coordinating item rentals between multiple parties. In certain embodiments, participants of the system interact with each other at a server connected through the Internet (e.g., mediated by the server, etc.). Each participant can be a provider/lender, a renter, or both at the same time. According to an embodiment of the present invention, a rental management system is defined first by specifying a set of (standardized) item types that can be rent (e.g., lent and borrowed). Each item type can have subtypes (and subtypes of a subtype, etc.) based on certain attributes. For example, an automobile rental system can provide three car types for rent, that is, a passenger car, an SUV, and a pickup truck, with the passenger car type having three subtypes, compact, midsize, and full-size, etc.

In some embodiments of the present invention, a rental system operates by allowing (registered) providers to list the rental items in their possession (e.g., offers) and by allowing (registered) renters to input lists of requesting items or item types (e.g., bids). In a certain embodiment, a central server maintains these lists (e.g., one list for all offers and one list for all bids, or two lists per each user, etc.). These lists can be dynamically updated. According to an embodiment of the present invention, a server computer maintains certain required information as to which items are currently for rent and which items are currently being requested as well as certain data pertinent to rentable items and participants. At any given time, the system looks for a match between the available rental items/offers and requests (e.g., based on predetermined rules and algorithms), and if one is found, contract is entered between these two parties (e.g., either directly or in a server-mediated way, etc.). For example, in a certain embodiment, an item from the top of a rental queue that meets the criteria of the request is rented to the requester who has made a bid first. In a certain other embodiment, the renter may be able to choose (e.g., from multiple offers) which item to rent (or, from whom, etc.), or vice versa.

The contract can take on various forms, e.g., based on a predetermined system setup. For example, in one embodiment of a mutual or multi-party rental system, the lending party obtains a right to rent/borrow the same or a similar type of item/service in the future (e.g., from the system, from a user in a certain group, etc.), whereas the borrowing party is obligated to provide/lend the same or a similar type of item/service in the future (e.g., to the system, to another user in a certain group, etc.). In other embodiments, a point system might be used so that a certain point value (e.g., based on the rental item type, renal period, etc.) is awarded to the lending party. The borrowing party, on the other hand, gets a negative point value. The system might enforce certain constraints so that no participant's overall point can go below a certain preset value. In some embodiments, the point awarded to a lender/provider is generally smaller than the point deducted from a borrower/renter (e.g., for a particular type of transaction). In some cases, this point spread is used so that the system can retain certain points (or, values). In yet other embodiments, cash-based transactions might be implemented (e.g., settled monthly, quarterly, or per every transaction, etc.).

A multi-party rental system can be categorized by various factors. For example, a rental system can consist of two distinct and separate groups of providers and renters. Or it can contain only one type of participants, who are both providers and renters. It is also possible to set up a system which may utilize certain aspects of both types of systems. According to some embodiments of the present invention, rental contracts may be either one (or both) of two types: An exchange-type rental contract and a currency-based rental contract. Some systems may only allow exchange-type rental contracts, whereas other systems might use more traditional currency-based contracts. A multi-party rental system can also be classified based on the presence of different types of "market makers". Market makers facilitate rental transactions and hence increase the "liquidity" in the system. According to an embodiment of the present invention, participants of a multi-party rental system may belong to one or more "groups" or "communities" (e.g., with associated attributes, etc.). Certain items may be exchanged (e.g., rented) within a certain group(s) only. In a certain embodiment, items (or, item types) are grouped into multiple classes/groups (e.g., based on the community to which their providers belong, etc.) and, for example, an access control is enforced based on the item groups (or, item type groups).

Therefore, as summarized herein, the present invention provides, among other things, a system and method for rental management between multiple parties. These and other embodiments, features, aspects, and advantages of the present invention will be apparent from the accompanying drawings and from the detailed description and appended claims which follow.

BRIEF DESCRIPTION OF THE DRAWINGS

The novel features of the present invention are set forth in the appended claims. The invention itself, however, as well as preferred modes of use, and advantages thereof, will best be understood by reference to the following detailed description of illustrative embodiments when read in conjunction with the accompanying drawings, wherein:

FIG. 8 illustrate an embodiment of item/offer and request/bid queues.

FIG. 11 illustrate various processes of rental operation according to certain embodiments of the present invention.

FIG. 11C shows an exemplary process for returning rented items, whereas

DETAILED DESCRIPTION

Figure 1A:
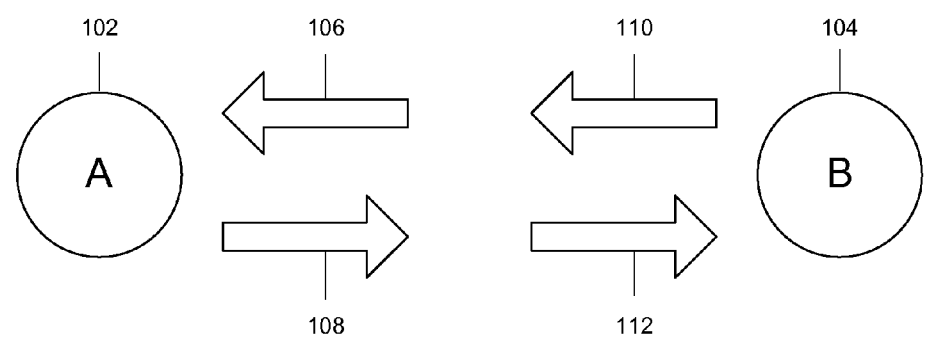
FIG. 1A illustrates a two-party rental (or, exchange, etc.) scenario. The arrows indicate the rental directions as explained in the detailed description section.

At least one embodiment of the present invention is directed to a rental system between multiple providers and multiple renters. The present invention will now be described more fully hereinafter with reference to the accompanying drawings, in which various exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Likewise, for purposes of explanation, numerous specific details are set forth in the following description in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention. Parts of the description may be presented using terminology commonly employed by those skilled in the art to convey the substance of their work to others skilled in the art. Also, parts of the description may be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

The invention may utilize a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet. In addition, it should be understood that the programs, processes, methods, etc. described herein are not related to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method operations described herein by way of dedicated computer systems in a specific network architecture with hard-wired logic or programs stored in nonvolatile memory such as ROM (read only memory).

Various methods will be described as multiple discrete operations in turn in a manner that is most helpful in understanding embodiments of the present invention. However, the order of the description should not be construed as to imply that these operations are necessarily to be performed in any particular order, in particular, in the order of the presentation. Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Figure 1B:
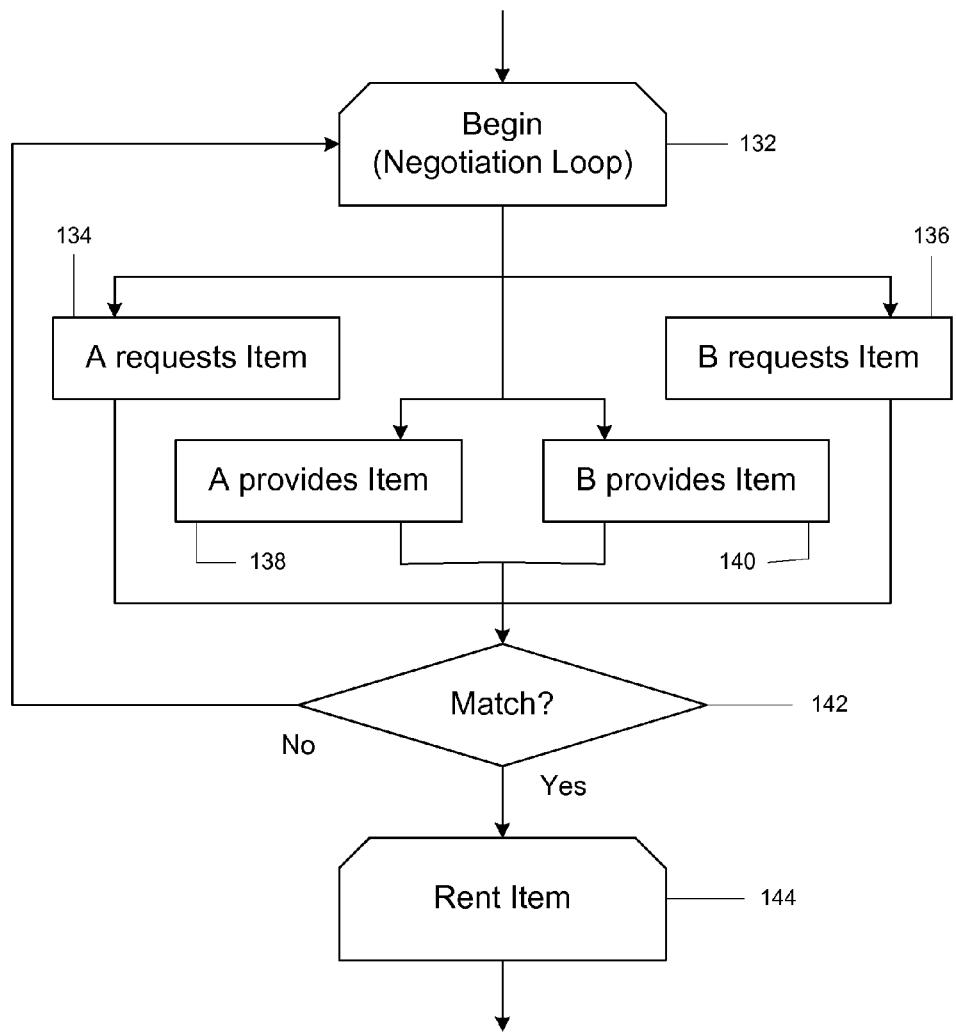
FIG. 1B is a flow chart illustrating the rental process based on the same setup as in FIG. 1A. The simplified negotiation process shown in the figure as a loop. When there is a match, the rental is processed.

In accordance with the teachings of the present invention, automated systems and methods for coordinating item rentals between multiple parties are disclosed. In certain embodiments, participants of the system interact (e.g., anonymously) with others at a central server or a set of servers connected via a communications network such as the Internet. Each participant can be a provider, a renter, or both at the same time. Rental systems can be designed with many different flavors. One possible design would be based on barter-style contracts. For example, FIG. 1A shows a simple rental scenario involving two parties. The party A, 102, expresses his or her intent to lend certain items (e.g., "an offer to rent", etc.), indicated with the arrow 108, and his or her intent to borrow certain items in return (e.g., "a bid to rent", etc.), indicated by the arrow 106. The party B, 104, does the same, again indicated with arrows 110 and 112 in the figure. According to an embodiment of the present invention, the offers and bids are managed by a server. When there is a match, that is, when there exist two items, X and Y, such that X can be rented from A to B, and Y can be rented B to A, the contract is entered (e.g., under the assumptions that rentals of X and Y for certain periods provide similar values, etc.). In this simplified scenario, the contract is fulfilled when the promised items are rented to each other, and eventually returned to their original owners. The first part of the rental process is illustrated in FIG. 1B in a flow chart. The negotiation starts at 132 and continues till an item is rented, 144. The system maintains the requests from both parties, 134 and 136, which correspond to arrows 106 and 112 in FIG. 1A, respectively, and the availability of items, 138 and 140, which correspond to 108 and 110 in FIG. 1A, respectively. When there is a match (e.g., which meets various conditions, etc.), at 142, the negotiation process ends by initiating the rental process, 144.

Figure 2A:
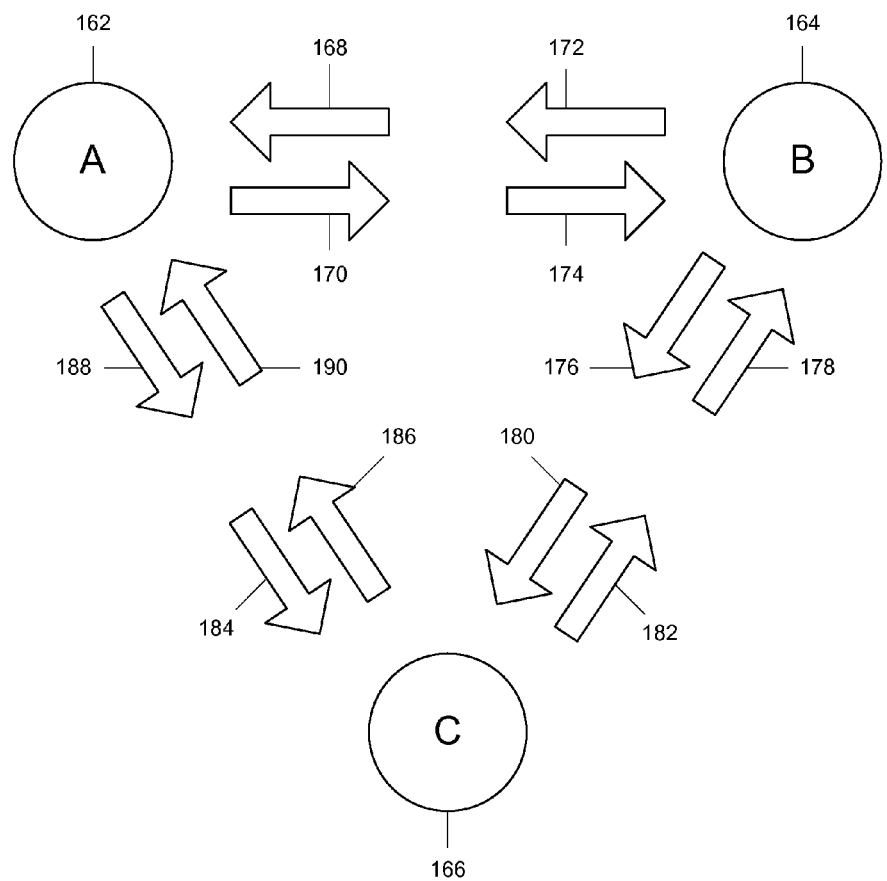
FIG. 2A shows an exemplary rental scenario involving three parties A, B, and C. The arrows indicate rental directions as in FIG. 1A.

This mutual rental system based on simple exchange contracts can be extended to those involving exchanges among multiple parties. This is illustrated in FIG. 2A for three participants, A, B, and C, which are indicated as 162, 164, and 166, respectively. As in FIG. 1A, the arrows, 170, 172, 176, 182, 186, and 188, indicate the availability of items (e.g., offers), and the arrows, 168, 174, 178, 180, 184, and 190, indicate the willingness to rent (e.g., bids). Note that each party has two outgoing arrows and two incoming arrows. The availability of items for rent may be dependent on whom it is directed to. Likewise, requests for rent can be different based on the potential lenders. When there exist 6 items that satisfy all 12 requirements, there will be contracts among all three parties. As can be easily recognized, the complexity of the system increases exponentially even for this simple design as the number of participants and/or the number of rentable items increase.

Figure 2B:
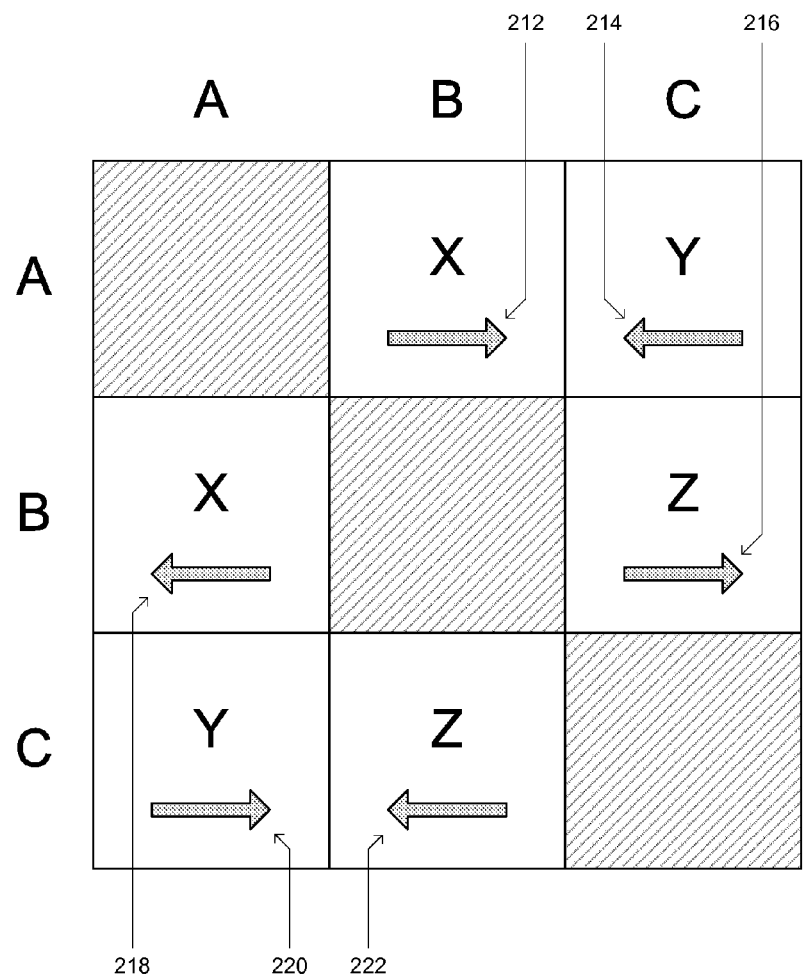
FIG. 2B is an exchange/rental matrix based on the scenario of FIG. 2A. In this example, three items X, Y, and Z have been rented among the three participants, A, B, and C. The six small arrows in the matrix represent rental directions.

FIG. 2B shows an exemplary rental/exchange matrix among these three participants, A, B, and C, from FIG. 2A. In this example, three items, X, Y, and Z, meet the rental requirements for three participants, and they are rented from one to another. Arrow 212 indicates the fact that the item X is rented from A to B, whereas the arrow 218 indicates the same fact that B borrows X from A. Note that this matrix is "antsymmetric" in terms of arrow directions. Likewise, arrows 214 and 220 indicate that item Y is rented from C to A, and arrows 216 and 222 indicate that item Z is rented from B to C. In general, an exchange matrix representing a rental scenario involving m parties is an m-by-m matrix. All its diagonal elements are defined to be zero, and the matrix will be antisymmetric if we regard the direction of the lending as a sign of the element. If each party makes one offer and one bid, then there are order of S! ways of possible exchanges, where $S=(m*(m-1))/2$, under certain assumptions (e.g., if we assume each party has unlimited supplies of all item types, etc.). In reality, many assumptions will not be true, and this number S! will be an upper bound. In fact, as the number of parties m grows, this number will approach zero, meaning that perfect full rental scenario involving all parties at the same time will be hard to come by (e.g., at any given moment). It should be noted, however, that rental events generally need not occur at the same time among all participants. This aspect of certain embodiments of the present invention will be further elaborated later in this disclosure. It should also be noted that as an item "circulates" the distinction between its owner and its current holder becomes less important. A typical rental activity (e.g., in terms of item delivery, etc.) will occur among two participants (e.g., either directly or through an intermediary such as a central server, etc.), neither of whom may be an owner of the item. In certain embodiments of the present invention, a rental transaction may always involve the central server(s). For example, items will be "rented out" to a server and items will be rented from a server. In this type of embodiments, the server may be viewed as a "market maker". In certain other embodiments, renters and/or providers may be directly involved in rental transactions. In this type of embodiments, the server may only provide services such as listing of offers and bids, matching compatible offers and bids, etc. In some cases, the renters/providers may also be able to specify the other parties in rental transactions. For example, a renter may be able to rent a certain item from a selected provider (e.g., assuming that there multiple offers).

Figure 3A:
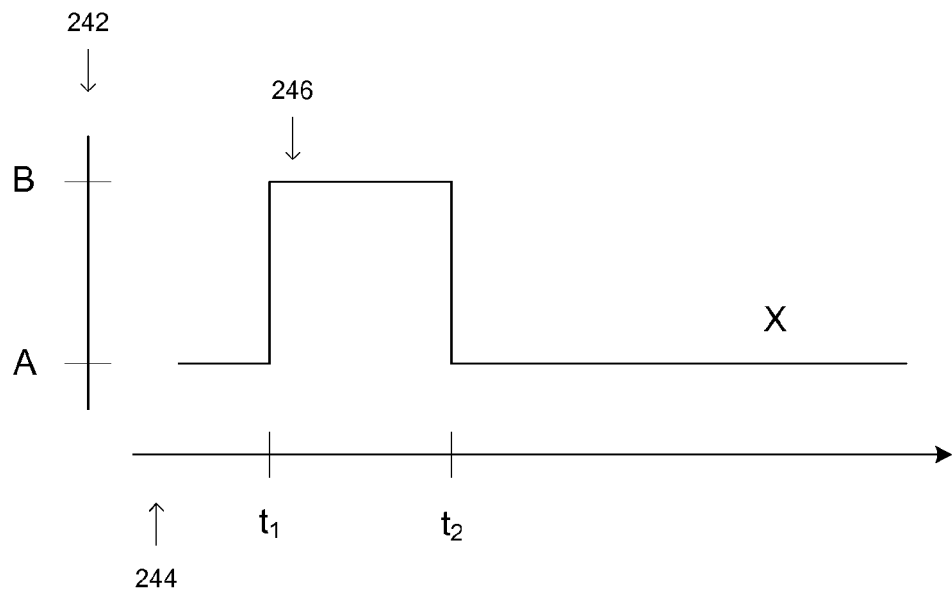
FIG. 3A illustrates an embodiment of a rental transaction system based on the delayed-exchange model. Vertical axes are used to represent possession of the items either by User A or User B. The horizontal axes represent the direction of time in an arbitrary scale.

This rental method of direct-exchange (e.g., as illustrated in FIGS. 1 and 2) can be extended in a number of ways. FIG. 3A illustrates a slightly generalized method based on delayed-rental contracts according to an embodiment of the present invention. In the figure, two parties, A owning item X and B owning item Y are shown. The horizontal axes 244 represent time in an arbitrary scale. The vertical lines 242 symbolically represent the temporary ownership of items by A or B, and the two winding lines, 246 and 248, extending along the time axis, schematically represent (temporary) possession/holding of items X and Y, respectively. In the top figure illustrating the temporary possession of item X, it is shown that A lends X to B between time $t_1$ and $t_2$. In return, as is shown in the bottom figure for item Y, A borrows Y from B between time $t_3$ and $t_4$. Note that these two time periods need not coincide, and they in general need not span the same amount of time intervals.

Figure 3A:
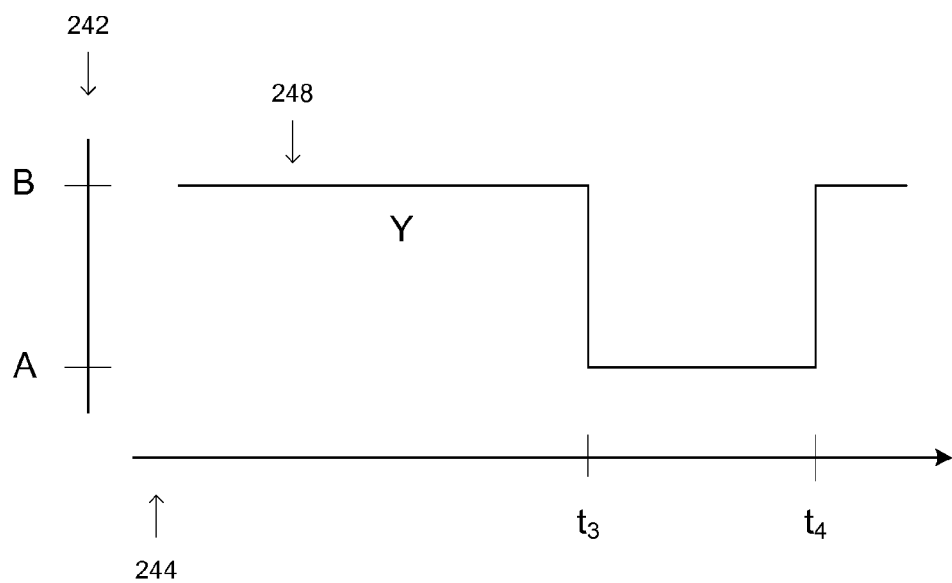
Figure 3B:
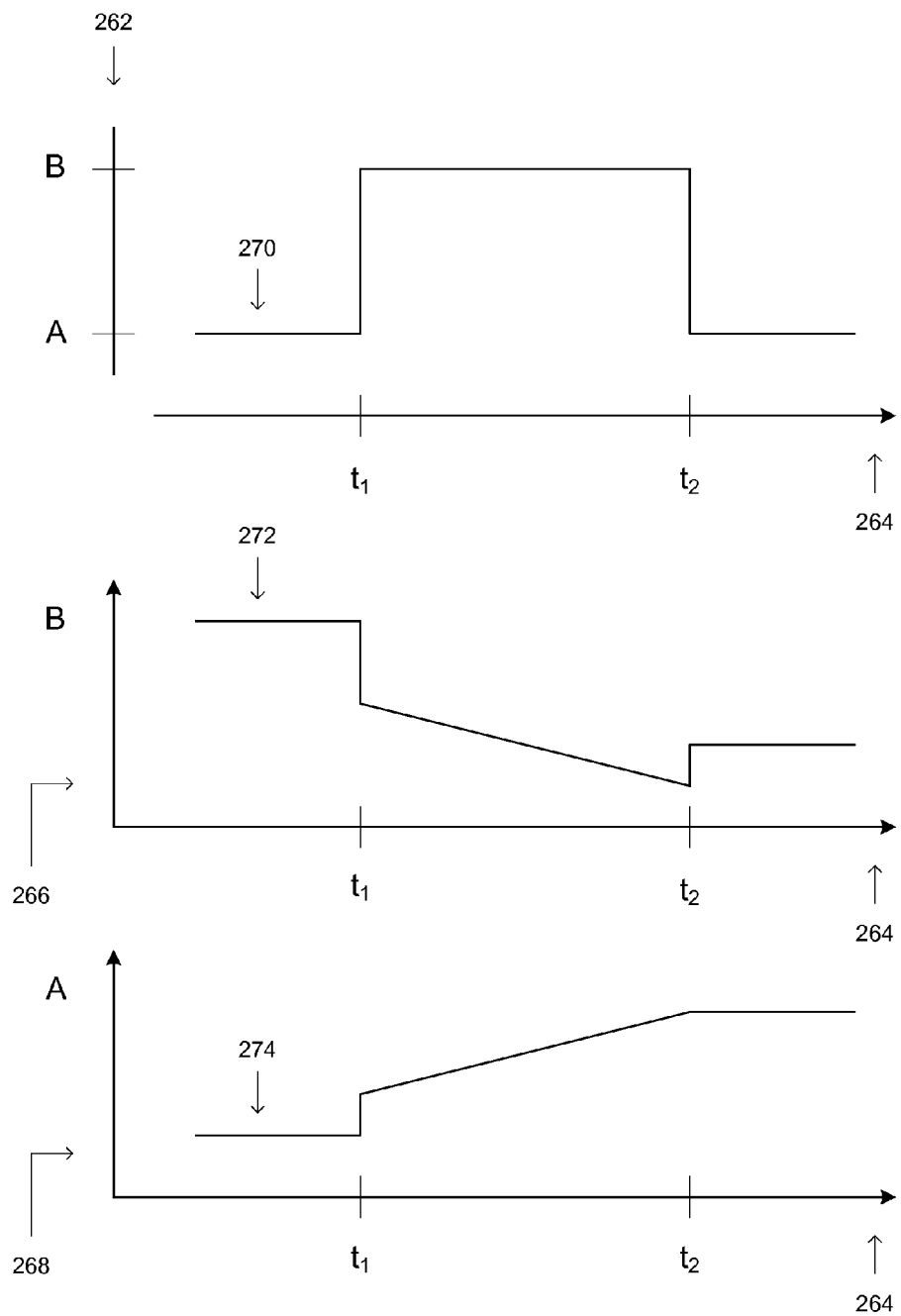
FIG. 3B illustrates an embodiment according to a point-based system. The top figure is a schematic representation of renting of an item from A to B as in FIG. 3A. The bottom two figures show point values of A and B, respectively, as a function of time.

FIG. 3B shows another aspect of a rental system design based on a point system. Each participant of the system is associated with a point value according to an embodiment of the present invention. Whenever a participant rents (e.g., borrows, etc.) an item, his or her point value decreases by a predetermined amount (e.g., based on the item type, rental duration, etc.), whereas the owner of the rented item, or lender, is awarded by a preset amount (e.g., based on the item type, rental duration, etc.). These amounts can be some functions of different attributes of rental contracts, for example, the item's value, quality, and the rental period, etc. With reference to FIG. 3B, the top figure depicts the same situation shown in the top part of FIG. 3A, in which the user A rents an item to the user B at time $t_1$ and the item is returned at time $t_2$. The vertical axis 262 symbolically representing the possession or holding of the item (e.g., either by A or by B) is drawn against the time axis 264. The vertical rise and fall parts of the bent line 270 coincide with the renting and returning events, respectively.

The vertical axes, 266 and 268, in the bottom two figures represent point values of users B and A, respectively, according to an embodiment of the present invention. The point value of the renter B, 272, changes during this rental period. Likewise, the point value of the provider A, 274, also changes during this rental period. The point value lines exhibit a few characteristics, for example, the steps at time $t_1$ and gradual increase and decrease (either linearly or nonlinearly according to a certain preset function, etc.) between time $t_1$ and time $t_2$, etc. These particular lines are drawn for illustration purposes only, but people of skill in the art can easily design a suitable policy regarding point values, based on the current disclosure. In some embodiments, rental "price" comprises, among other things, an initial transaction fee (e.g., which does not depend on the length of the rental period, etc.), a deposit (e.g., which will be re-credited when the item is returned, etc.), and a rental fee proportional to the rental period (e.g., charged daily or at the end of the rental period, etc.). According to an embodiment of the present invention, point values of users in his or her account may accrue "interests" (e.g., in either direction) based on a certain rule and/or "interest rates", etc. A user whose items have been rented out more often will typically maintain higher points and he or she can be awarded through additional points (e.g., settled monthly, quarterly, etc.) in a certain embodiment. A user with negative points may be given additional "penalties" in some embodiments of the present invention.

When a multi-party rental system is set up, each registered user receives certain preset amount of points to get started according to an embodiment of the present invention (or, when users register with the system, etc.). Otherwise, no rental process might be initiated (e.g., because nobody has enough points for renting). In an alternative embodiment, users are assigned with some "credit rating" (which can be dynamically updated, etc.), and based on their credit ratings, their overall points can become negative as long as they are above certain user-dependent point levels. Another option is assigning certain cash equivalent values to a point and selling points to the users of the system. In this case, the users may also be able to "sell" their points (e.g., accumulated by renting out their items more often then renting/borrowing other users' items, etc.) back to the system (e.g., not unlike the way mileage points in frequent flyer programs can be redeemed for certain (cash-equivalent) rewards, etc.). These aforementioned systems, according to certain embodiments of the present invention, will be most useful when all participants are both eligible renters and providers. In some cases, more traditional fee-based systems can be used. Systems charging fees based on the usage of the user can be viewed as a special case of the point-based system. In this case, rewards (e.g., negative fees) will be given based on the usage of the items the user has provided to the system. Fees can be, however, charged simply based on the user's membership level regardless of usage. In this case, the rewards may also be a fixed amount based on the user's contribution, for example, in terms of the number of the provided items (or, fulfilled offers, etc.).

Figure 4:
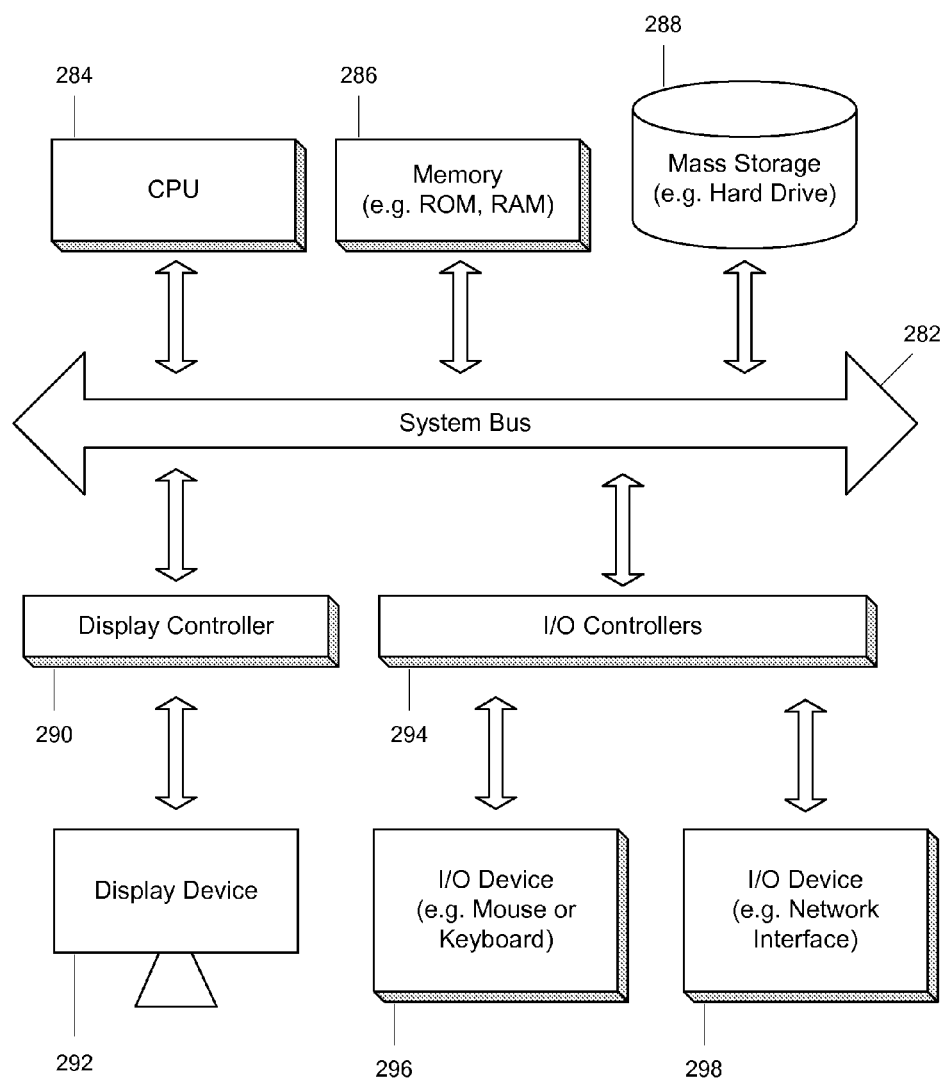
FIG. 4 shows an exemplary (general-purpose) data processing system with which various embodiments of the present invention can be practiced.

Before we present further exemplary embodiments and/or various designs/implementations, FIG. 4 shows a block diagram illustrating various components of an exemplary data processing system such as a personal computer with which embodiments of the present invention can be practiced. This and other data processing systems may be used with various embodiments of the present invention. As will be appreciated by one of skill in the art, however, the present invention may be embodied as a method, data processing system or program product as well as an article of manufacture or an apparatus. Thus the scope of the invention should be determined by the appended claims and their legal equivalents, and not by the examples given. Note that while the block diagram of FIG. 4 illustrates various components of a data processing system, it is not intended to represent any particular architecture or manner of interconnecting the components. It will also be appreciated that personal computers, laptops, and network computers, and other data processing systems such as cellular telephones, personal digital assistants (PDAs), digital media players, etc. which have fewer components or perhaps more components may also be used with the present invention.

As shown in FIG. 4, the exemplary data processing system includes at least one bus 282 which is coupled to a microprocessor(s) 284 and a memory 286 such as a ROM (read only memory) or a volatile RAM (random access memory) and a non-volatile storage device(s) 288. The system bus 282 interconnects these various components together and also interconnects these components 284, 286, and 288 to a display controller(s) 290 and a display device(s) 292 such as LCD (liquid crystal display) screens and to peripheral devices such as input/output (I/O) devices 296 and 298 which may be mice, keyboards, input wheels, modems, network interfaces, printers and other devices which are well known in the art. Typically, the I/O devices 296 and 298 are coupled to the system through I/O controllers 294. The volatile RAM 286 is typically implemented as dynamic RAM (DRAM) which requires power continually in order to refresh or maintain the data in the memory. The mass storage 288 is typically a magnetic hard drive or a magnetic optical drive or an optical drive or a DVD ROM or other types of memory systems which maintain data (e.g. large amounts of data) even after power is removed from the system. Typically, the mass storage 288 will also be a random access memory although this is not required. While FIG. 4 shows that the mass storage 288 is a local device coupled directly to the rest of the components in the data processing system, it will be appreciated that the present invention may utilize a non-volatile memory which is remote from the system, such as a network storage device which is coupled to the data processing system through a network interface 298 such as a modem or Ethernet interface. The bus 282 may include one or more buses connected to each other through various bridges, controllers and/or adapters as is well known in the art. In one embodiment, the I/O controller 294 includes a USB (universal serial bus) adapter for controlling USB peripherals and an IEEE 1394 ("firewire") controller for IEEE 1394 compliant peripherals. The display controllers 290 may include additional processors such as GPUs (graphical processing units) and they may control one or more display devices 292.

Figure 5:
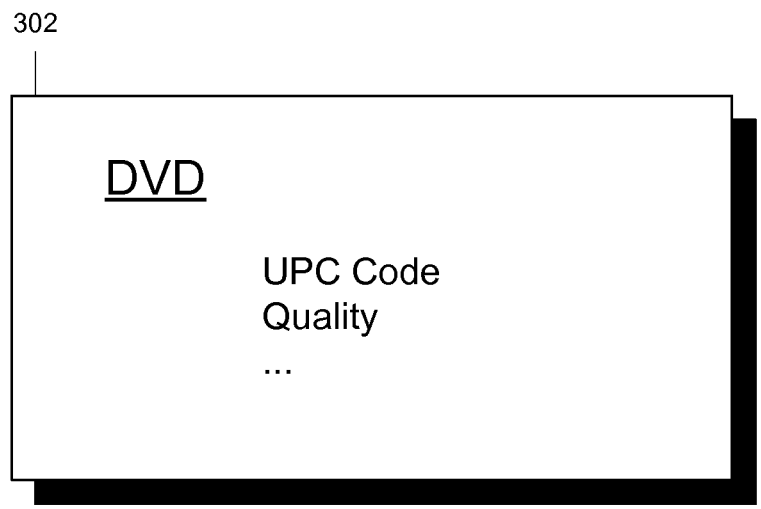
FIG. 5 shows examples of "commoditized" or standardized item types. Some attributes of DVDs that can be useful in commoditizing DVD titles are shown in the top card, whereas the bottom card lists some of the attributes that can be useful for setting up automobile rental contracts.
Figure 5:
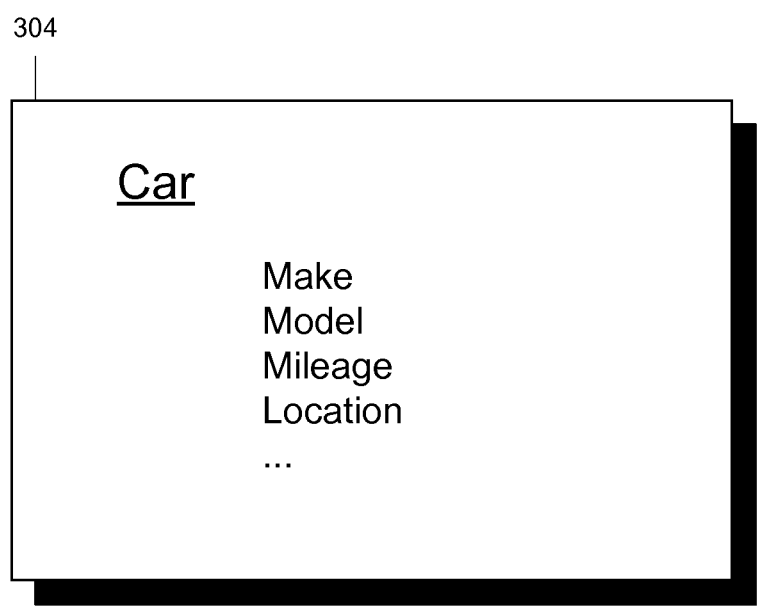

Turning now to FIG. 5, a multi-party rental system is defined by first specifying a set of item types that can be rent (e.g., lent or borrowed), which is herein referred to as "commoditizing". For example, a set of "Region 1-encoded DVD movie titles" will define what can be exchanged (e.g., lent or borrowed) on the system. Each item type can have one or more sub-types based on certain attributes. For example, an automobile rental system can provide three car types for rent, that is, a passenger car, an SUV, and a minivan, with the passenger car type having three subtypes, compact, midsize, and full-size. (Other attributes such as a car make, a car model, etc, may also be used to define item types or item subtypes in different embodiments.) Likewise, DVD rental system can classify DVDs based on various attributes. FIG. 5 shows some attributes of rental DVDs 302 and rental automobiles 304. Note that for renting automobiles the location of the item might be important, whereas for DVDs that's less of a concern. Commoditizing or standardizing items or item types would facilitate automating a rental system in certain embodiments of the present invention. (That is, rental transaction may occur based on the standardized item types/subtypes rather than the individual or specific items, etc., according to an embodiment of the present invention.)

Figure 6A:
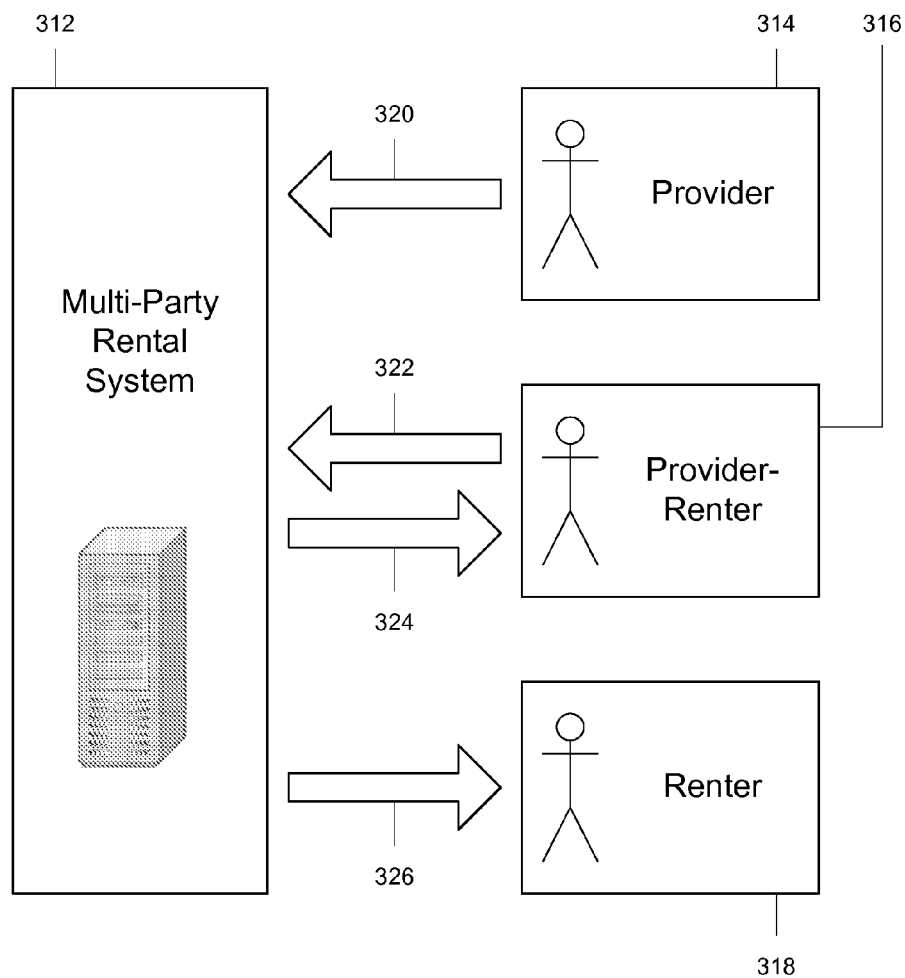
FIG. 6A shows main actors in an exemplary embodiment of the present invention. In this embodiment, all three types of users are allowed in the system. The arrow represents the flow of items during rental process.

As described earlier, each participant can be a potential provider, a renter, or both at the same time, depending on the system setup. FIG. 6A shows three different types of main actors, in UML jargon, assuming that this embodiment of the rental system 312 allows all three types of participants (or, membership types, etc.). A participant 314 is an item provider (e.g., for a particular item type or types), that is, someone who can make an offer to rent, whereas a participant 318 is an eligible renter (e.g., for a particular item type or types), that is, someone who can make a bid to rent. A participant 316 represents a user who is both an item provider and an item renter. The arrows in the figure schematically represent the flow of items during any rental process. The users 314 and 316 provide items to the system, as indicated by the arrows 320 and 322, and the users 316 and 318 rent items from the system, as indicated by the arrows 324 and 326. In general, users in the system may be assigned different permission or privilege levels (or, access levels, etc.). Based on their privilege levels, users may lend or borrow certain items, or items of certain standardized item types (and subtypes, etc.). Some embodiments of the present invention may put additional restrictions. For example, users who have rental rights but do not have enough points or have rented too many items may not rent any additional items (e.g., until further conditions are met, etc.). This will be further elaborated later, for example, with regards to FIG. 13.

Figure 6B:
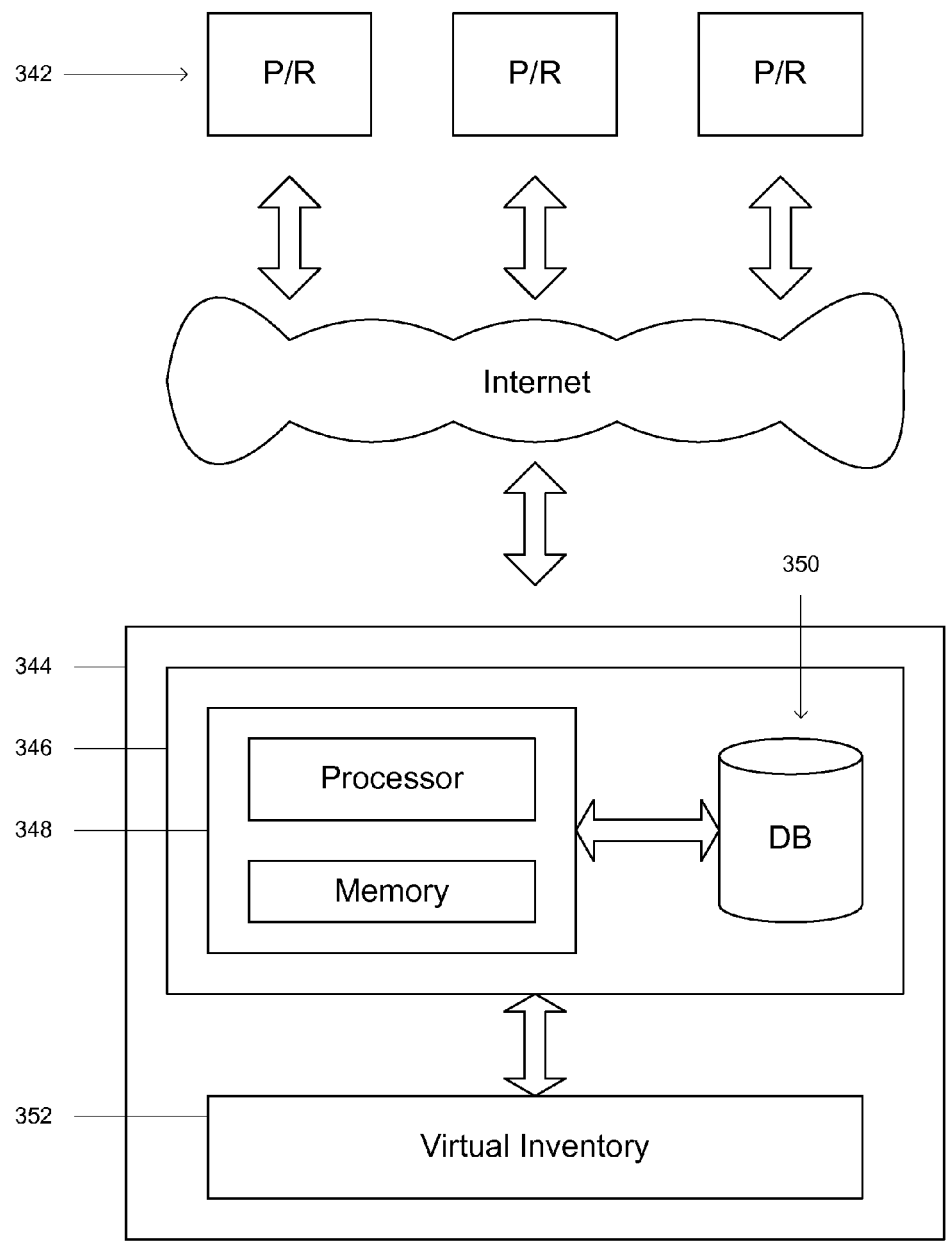
FIG. 6B is a block diagram of various related components of an embodiment of the system. The figure also includes various users, labeled P/R for provider/renter, connected to the system via a communications network.

With reference now to FIG. 6B, an embodiment of the present invention is shown as a block diagram. The figure also shows other components related to the operation of a rental system. The boxes with label, P/R, 342, represent the users of the system, providers and renters. These users will typically be connected to the system through local or wide area communications network, such as the Internet. The computer implementation of the system 346 will be comprised of hardware and software components 348 as well as databases 350 for storing persistent information. The system will also need some type of inventory management system 352 (e.g., for items, offers, bids, etc.). The inventory can be maintained in one or more central locations or it can be "virtual" in the sense that the items are almost always distributed among the participants of the system. For example, for an automobile rental system, maintaining one central inventory might not be practical in some cases. In a certain embodiment of the present invention, the renter can directly rent (e.g., take) a car from the provider once a rental contract is set up and agreed upon. On the other hand, for a system dealing with DVD movies, for example, maintaining (one or more) central inventories can be more efficient in certain cases. A hybrid model can also be implemented. For example, for rental systems for sport equipments such as skis or snowboards, the items can remain distributed during the "off-seasons" while they can be kept in some special locations such as places near ski resorts during the peak seasons. Note that, even in the case where the inventory is essentially maintained by each user, the delivery of the item from one renter to the next does not have to involve the central server. The server can just act as a transaction server (and, as a bulletin board, offer/bid listing service, etc.) in some cases to reduce the delivery cost (e.g., using one delivery as opposed to two, etc.).

Figure 7:
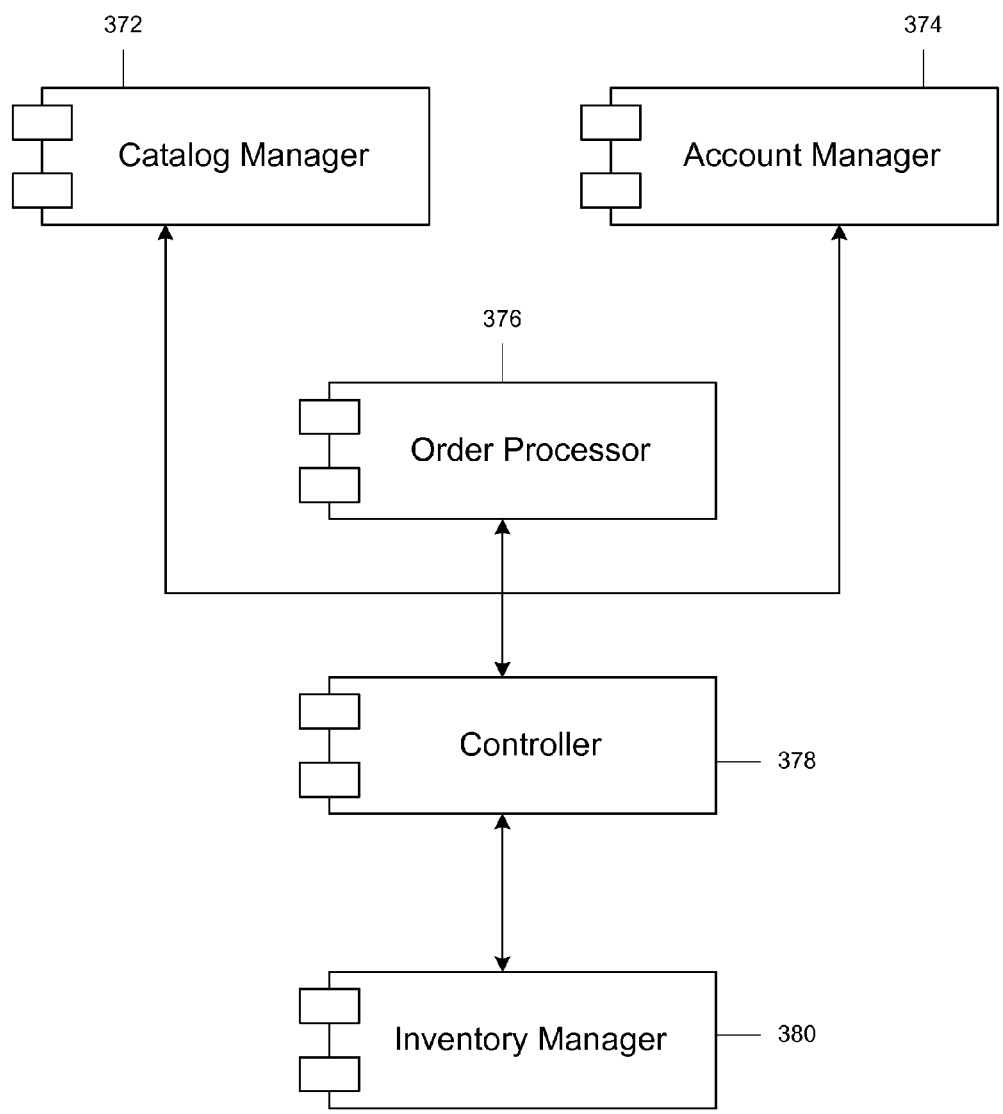
FIG. 7 shows a high-level component diagram of one possible implementation of a software embodiment of the inventive system. The figure shows four core modules which are coordinated by the central module, Controller. In this particular implementation, the user interface is also handled by these components.

FIG. 7 shows a high-level component diagram of one possible implementation of a software embodiment of an exemplary system according to an embodiment of the present invention. Certain processes of the present invention do not need to be embodied in a software form. In some embodiments, certain processes can be, for example, (at least partially) implemented using a pencil and paper (e.g., possibly with some type of bulletin board service to exchange inventory information among the participants, etc.). Automated (e.g., computer-implemented, etc.) systems will be, however, easier to use and more efficient (and scale better, etc.) when the size of the system increases. FIG. 7 is included here for purposes of full disclosure. As will be agreed by people of ordinary skill in the art, various processes of the present invention can be designed and implemented in software forms in many different ways (e.g., based on the description of various embodiments in the current disclosure). The figure shows but one such embodiment, where certain components are used to modularize various related tasks. In the particular exemplary design shown in FIG. 7, the Controller module 378 coordinates all other modules and handles the main process thread(s). Catalog Manager 372 deals with all item related information and processes, whereas Account Manager 374 deals with user-related information and various processes relevant to management of user accounts. Catalog Manager might be connected to separate one or more internal or external modules which maintain generic database(s) storing data related items and item types, etc. For example, in a DVD movie rental system, Catalog Manager, which manages DVD titles, might retrieve some additional information regarding movies from a specialized application (e.g., a movie Web site on the Internet, etc.). Rental contracts are processed in the Order Processor module 376 and the current inventory is managed by Inventory Manager 380 (e.g., managing items, item types, and the current offers/bids, etc.). In some embodiments, so-called "multi-tier" architecture is used to implement rental systems. Server(s) with various functionalities are interfaced with clients (e.g., Web-based, etc.), and data are stored in a relational database, which may reside across a communications network from the server(s). Inventory(s) may also be managed by separate server(s) or component(s) connected via a communications network.

According to certain embodiments of the present invention, a multi-party mutual rental system operates by first allowing (registered) providers to list the rental items in their possession (or, offers to rent), which we call "uploading", and allowing renters to input lists of their requesting items (or, bids to rent). These lists can be dynamically changed any time. When there is a match, the renter retrieves or receives the requested item, which we call "downloading". Note that uploading may generally be a two-step process (e.g., in some systems which manage their item inventory in physical locations). First, the user inputs to the system his or her intention (or, offer) to rent out a certain item (e.g., of a certain standardized item type). Then he or she sends the item to the system (e.g., through a delivery service, etc.). It should be noted that these two steps may occur at two distinct (not necessarily successive) times. For example, in certain embodiments, the actual delivery or handover (e.g., directly to the renter, etc.) may take place only after a rental contract is established.

Figure 8A:
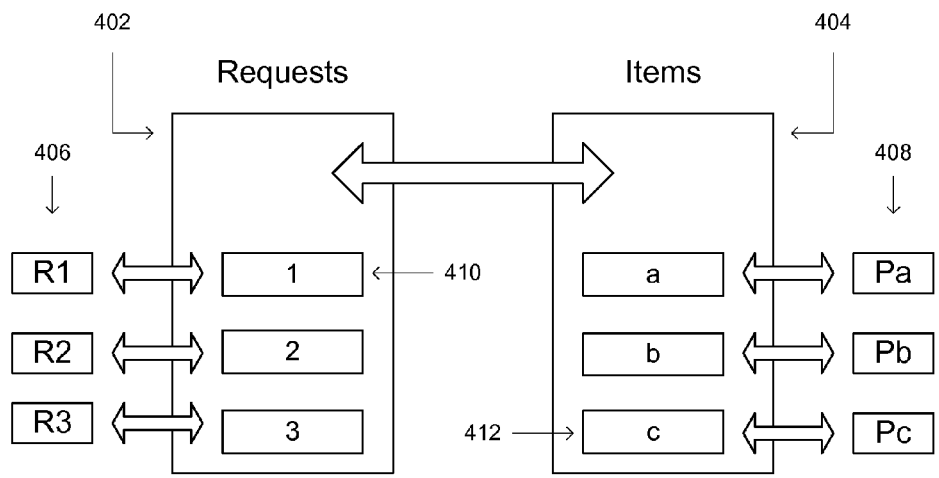
FIG. 8A shows a snapshot of these queues. Each request/bid has an associated data as to, among others, the user who has made that request. Each available item, or an offer to rent/lend each item, also has data associated with it. For example, the provider, or the owner of each item, is shown in the figure associated with the item.
Figure 8B:
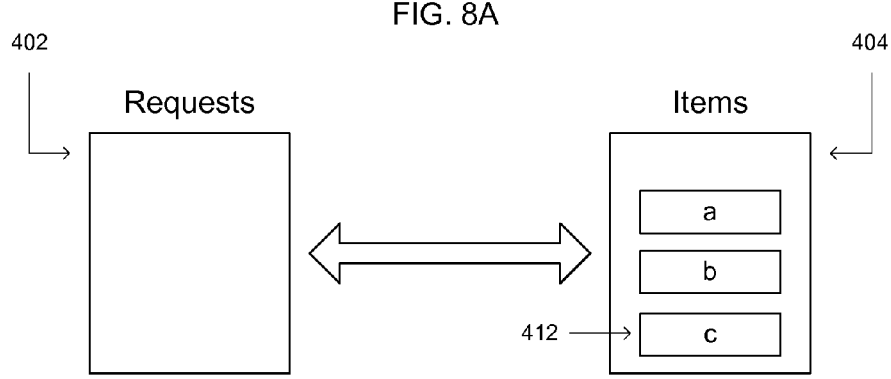
FIG. 8B shows one of the typical situations where there are items/offers but no requests/bids.
Figure 8C:
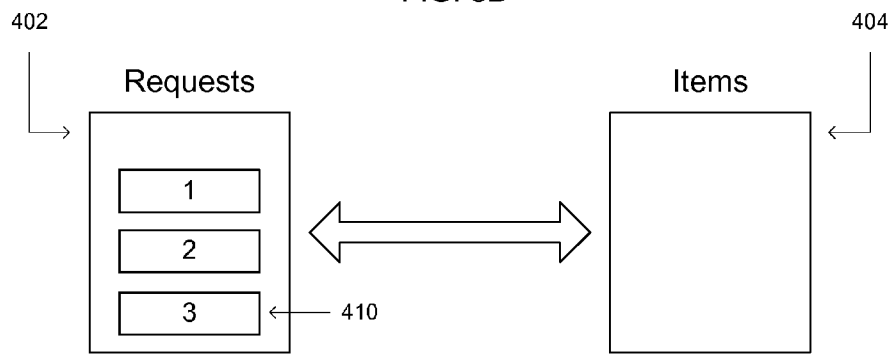
FIG. 8C shows another typical situation where the item is not available (or, there is no offer) even though there is a request/bid.

FIG. 8 illustrate an embodiment of a request queue 402 and an item queue 404. This pair of queues are implemented for each item type in this exemplary embodiment. In a certain embodiment, one request queue and one item queue may be used for each item type for each participant or each group, etc. The item queue 404 may include actual (rentable) items in the inventory. Or, in some embodiments, it may include, instead or in addition, (valid) offers to rent, etc. Likewise, the request queue 402 may include (valid) bids to rent the specified item types. FIG. 8A shows a snapshot of these queues. Each request 410 has an associated data as to, among other things, the user who has made that request/bid 406. Each available or rentable item, or an offer, 412, also has data associated with it. For example, the provider 408, or the owner of the item, is shown in the figure. According to an embodiment of the present invention, the queues or lists may also be stored in persistent storages (e.g., during normal operations, for backup purposes, for purposes of sharing data between multiple servers, etc.), for example, in a database. FIG. 8B shows one of the typical situations where there are items/offers but no requests/bids (e.g., at a given moment). FIG. 8C shows another typical situation where the item is not available (or, no offers) even though there is a request or a bid. The requests will not be fulfilled until a new item is provided (or, a new offer is made, etc.) in such a case. Note that these queues are implemented in FIFO (first-in-first-out) in this embodiment. Any new incoming request or new uploaded item is queued at the end (or bottom) of its respective queue. Different embodiments may use different implementations. According to an embodiment of the present invention, if a match occurs in the case of FIG. 8A, the item 'a' at the head or top of the queue 404 may be used to fulfill the first/topmost (or, oldest, etc.) request '1' in the queue 402, and so forth.

Figure 9A:
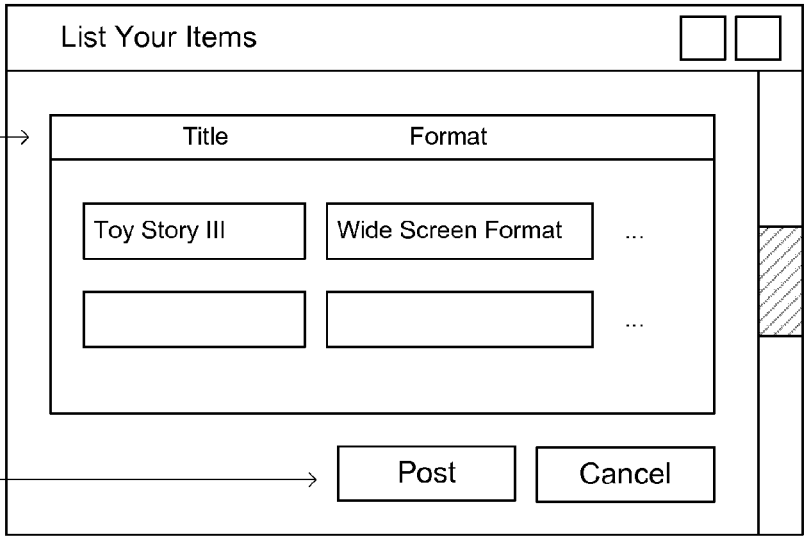
FIG. 9 show exemplary user interfaces for "uploading" and "downloading" items. Using a user interface such as that shown in FIG. 9A, a provider can make certain items available for rent by other people (e.g., registered users in the system, etc.). A potential renter/bidder can browse available items (or, offers) using an interface such as the one shown in FIG. 9B.
Figure 9B:
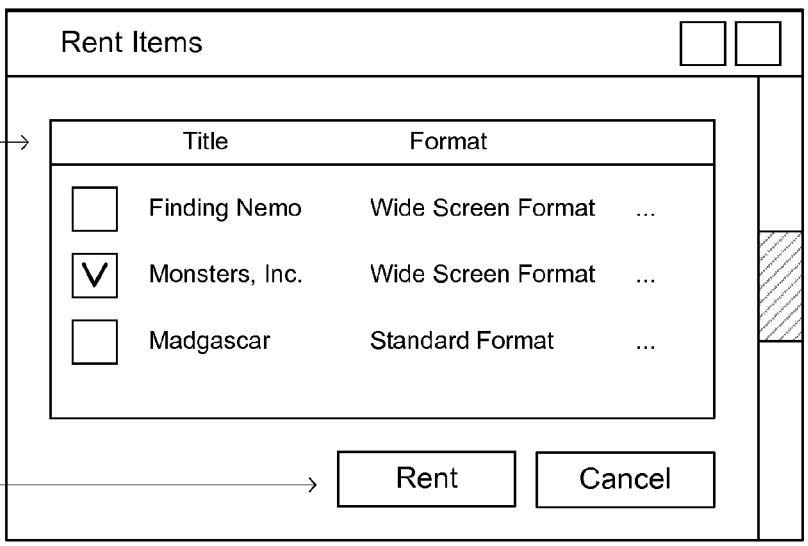

FIGS. 9A and 9B show exemplary graphical user interfaces for "uploading" and "downloading" items, respectively, according to an embodiment of the present invention. Using an interface as shown FIG. 9A, a provider can make certain items available for rent by other people. Other participants (e.g., potential renters, etc.) can then browse available items using an interface as shown in FIG. 9B, and place an order (e.g., make a bid to rent an item(s) of a certain item type(s), etc.). As mentioned earlier, uploading can be a two-step process, and hence the items made available through the interface of FIG. 9A may not immediately show up in the interface of FIG. 9B, in certain implementations. In the exemplary interface of FIG. 9A, the list window 434 and various process buttons 436 are contained in a window 432. All necessary information can be input through this list window 434 or other UI mechanisms. In some cases such as in a DVD rental system, the necessary information might be as simple as the item's UPC code, and possibly the (subjective) condition of the item (e.g., "excellent", "good", "fair", "poor", etc.). Certain attributes such as item conditions/qualities (e.g., the mileage of a rental car, etc.) may also be added/modified by the user or the system. On the other hand, the list screen 440 of FIG. 9B, which is contained in a window 438 and processed by the action buttons 442, may need to include as much information as possible to aid the user in making rental decisions. For instance, some commercial rental sites contain some auxiliary information such as average ratings (e.g., for particular item types) made by other users, etc. Even though not explicitly shown in the figure, additional information such as desired rental period, preferred/required subtypes, etc., may also be input through an interface similar to that shown in FIG. 9B. According to a certain embodiment of the present invention, the item list presented, for example, in the list 440 may be filtered, either by the system (e.g., based on the user's privilege levels, etc.) or by the user (e.g., based on the user's preference, etc.). In some embodiments, the information in the list 440 may be presented in multiple lists, for example, based on the item owners/providers, their associated "groups" or "communities", or based on items' classes or genres, etc. In certain embodiments, the user can also modify his or her bids using the list 440 (or, using a similar UI, etc.).

According to an embodiment of the present invention, a central server computer(s) maintains all required information as to which items are currently for rent and which items are currently being requested as well as data pertinent to rentable items and participants. At any given time (e.g., on a regular interval, or based on events such as new arrival of items or new bids, etc.), the system looks for a match between the available rental items or offers and requests or bids, based on predetermined rules and algorithms, and if one is found, contract is entered either between these two parties or in a system-mediated way (e.g., two separate contracts between the provider and the server and between the renter and the server, etc.). For example, in an embodiment, an item from the top of the rental queue that meets the criteria of the request/bid is rented to the requester who has made a bid first. In some embodiments of the present invention, a certain generic contract may be entered when a user registers with the rental system and any additional per-transaction contract may not be necessary. Once the rental contract/transaction is established, the item is delivered to (or, it may be picked up by, etc.) the bidder through various means (e.g., using a postal service, a courier service, etc.).

Figure 10A:
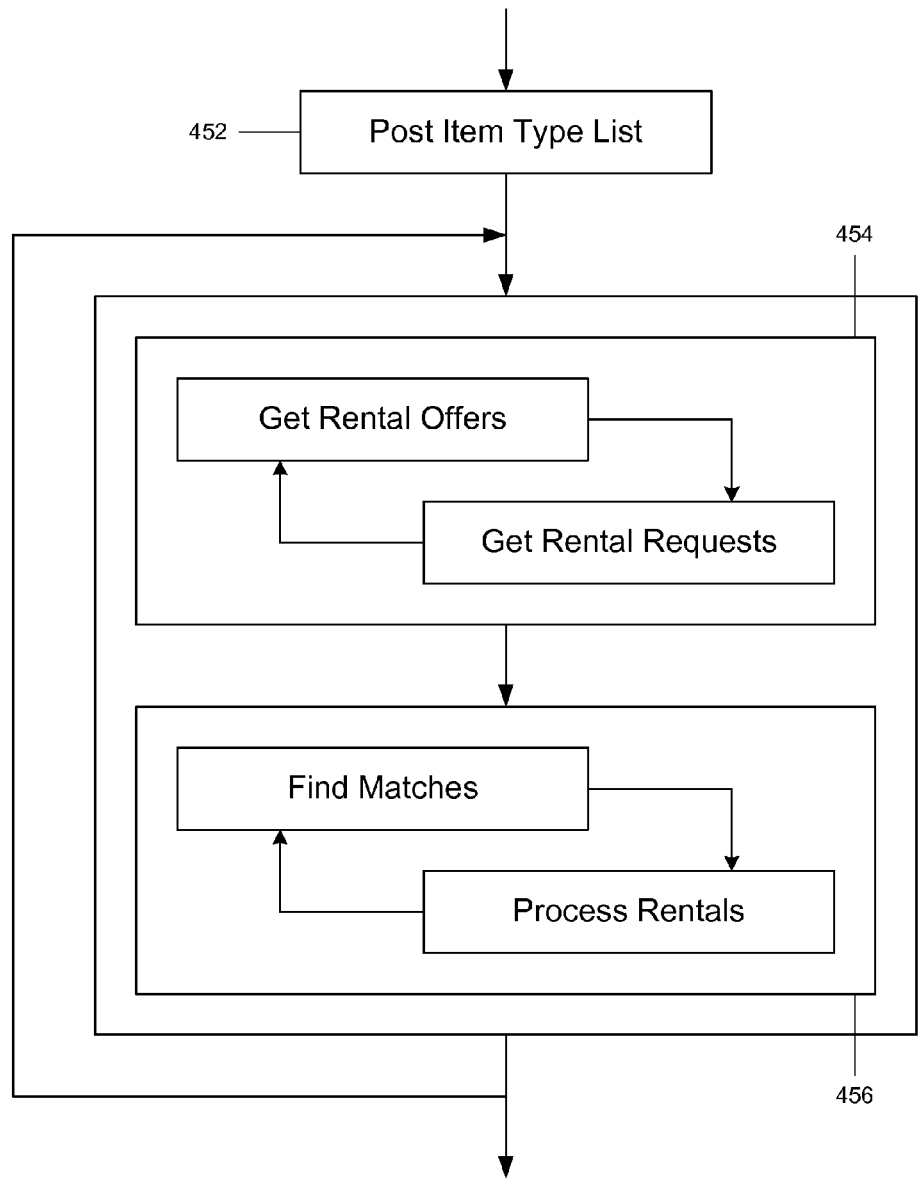
FIG. 10A is a flow chart illustrating certain basic operations in an exemplary embodiment of the present invention. Cyclically connected arrows indicate that those components form a loop. The exemplary process continues until interrupted.

FIG. 10A illustrates some exemplary operations according to one embodiment of the present invention. Cyclically connected arrows represent that those components form a loop, indicating that this is an ongoing/continuing process. The exemplary process starts at 452, and the system becomes available when it announces in some manner the (standardized) item types that can be rent (e.g., lent and borrowed) on the system. Some initial setup process such as allowing people to register on the system may also be necessary. These operations are not explicitly shown in this simplified diagram. According to an embodiment of the present invention, (certain) participants of the system may also be able to add (or, suggest for addition, etc.) item types that can be rent/exchanged on the system. The main operations of the exemplary process are divided into two segments and shown as two distinct blocks in the figure. The first part 454 deals with retrieving and disseminating lists of available items/item types (or, offers) and current rental requests (or, bids) at any given moment. The second part 456 deals with matching (e.g., between offers and bids). The matching will be based on a certain predefined algorithm, which should also be communicated to the users through some means (e.g., using "help" pages, etc.). In some embodiments, FIFO type of matching, for example, as shown in FIG. 8, is used. Generally, the more attributes are used to define or standardize item types (and subtypes, etc.), the more complex will be the matching algorithm. This is also true when the rental request can be made to a set of (multiple) item types rather than to a specific item type. For example, a user may want to rent a full-size car or an SUV, but not midsize or compact cars, etc. Other factors such as geographical distances between offers and bids and user preferences may also be included in a matching algorithm. Implementing this type of algorithm is, however, rather straightforward, and a person of skill in the art will not have trouble designing and implementing an algorithm that meets his or her need, based on teachings of the current disclosure.

Figure 10B:
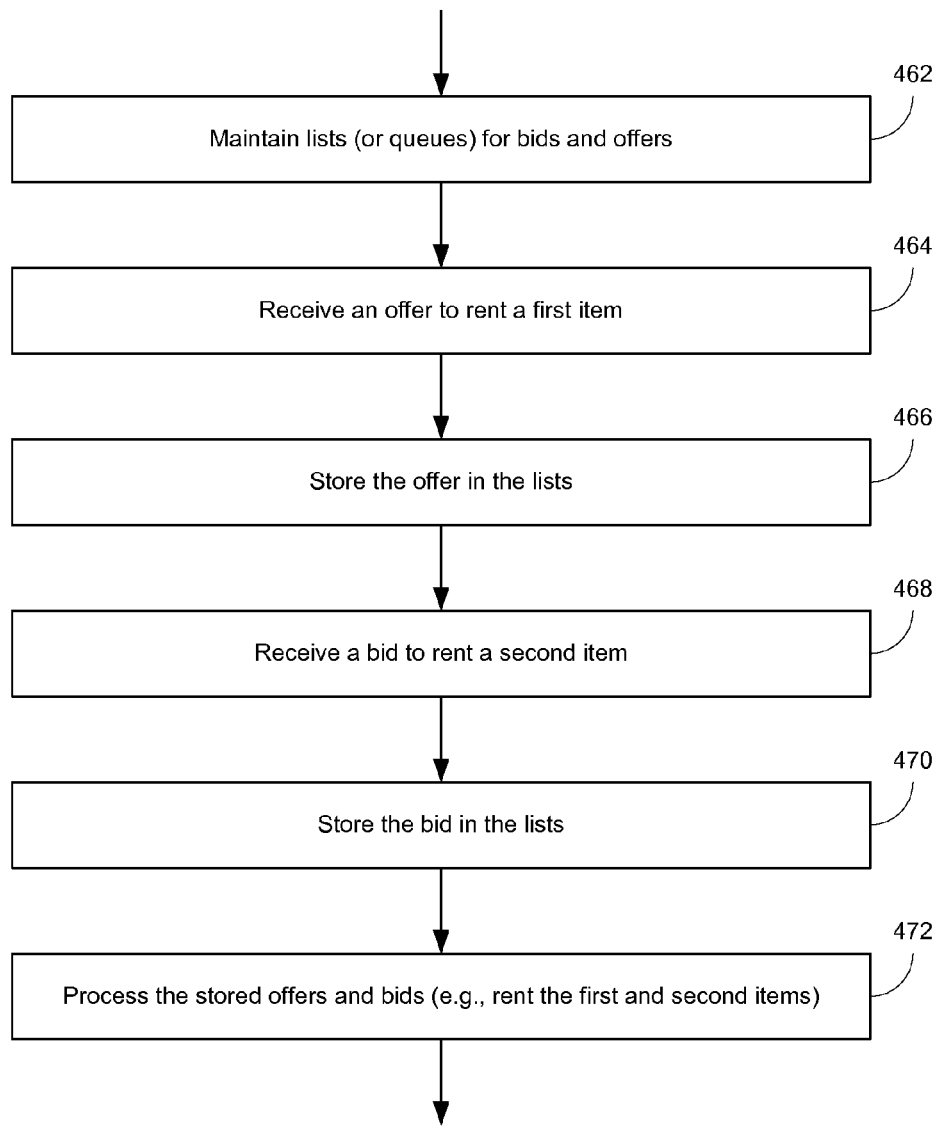
FIG. 10B depicts a flow chart illustrating another exemplary process according to an embodiment of the present invention.
Figure 11A:
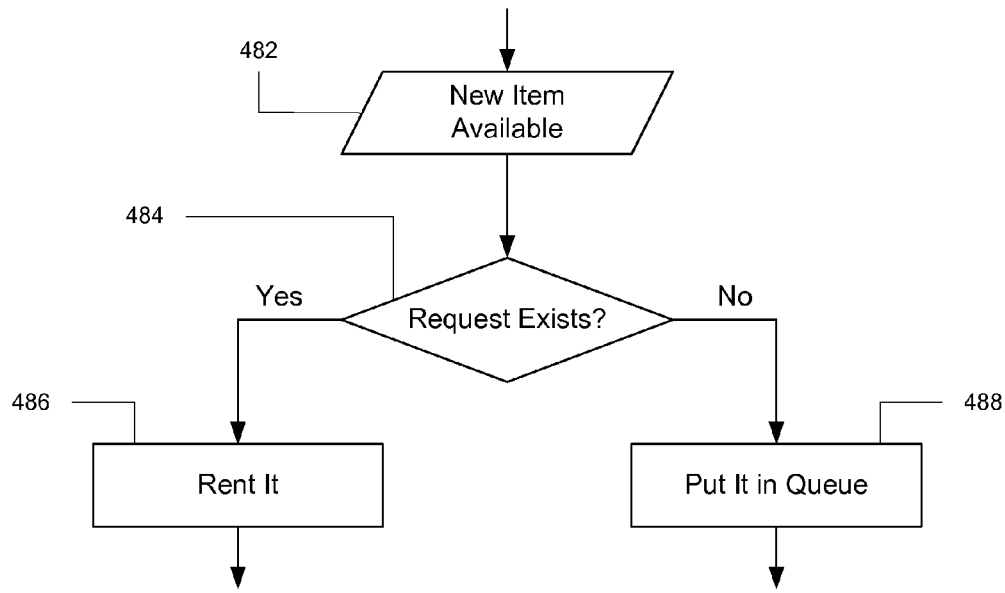
FIG. 11A shows an exemplary process when a new item becomes available (or, when such an offer is made).
Figure 11B:
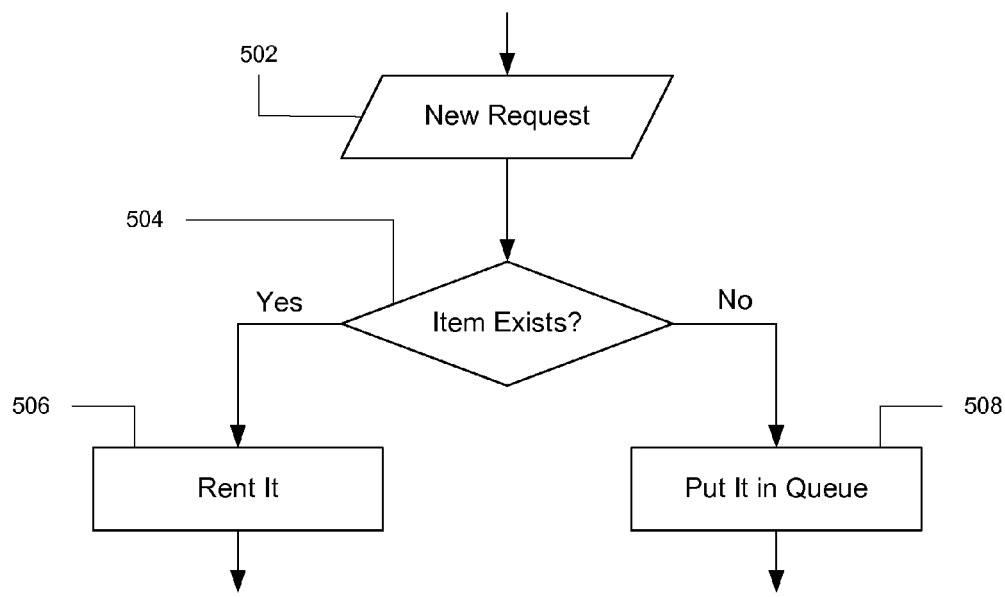
FIG. 11B shows an exemplary process when there is a new request or a bid for an item (or, an item type).
Figure 11C:
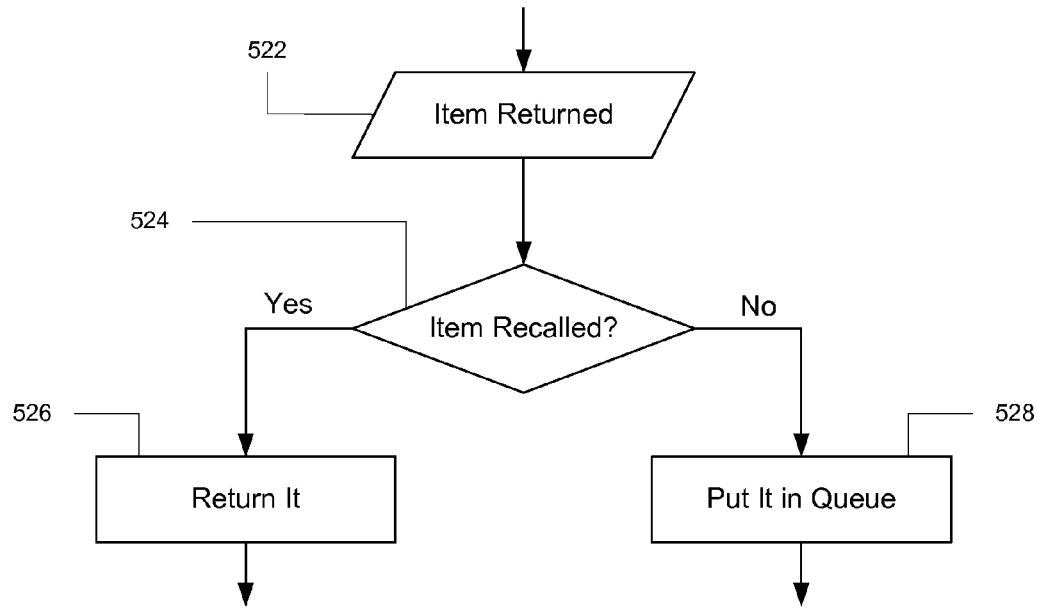
Figure 11D:
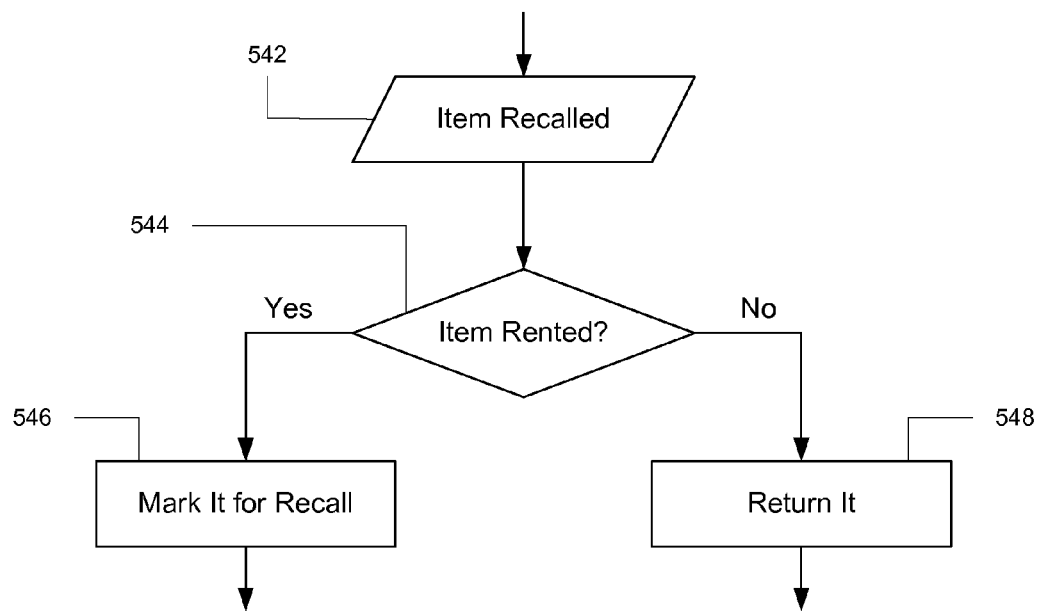
FIG. 11D is shows an exemplary "recall" process, according to at least one embodiment of the present invention. The owner of an item can recall the item even if it is currently rented out in a certain embodiment.

FIG. 10B depicts a flow chart illustrating another exemplary process according to an embodiment of the present invention. The exemplary system maintains lists for offers and bids for certain preset item types, as indicated in block 462. As stated earlier, the internal implementation may use certain data structures such as a FIFO-type queue. The lists may be presented to the users through various means, for example, as shown in FIG. 9. Then, the system accepts offers and bids, at 464 and 468, respectively. This, in turn, triggers updating of various lists, at blocks 466 and 470, in an embodiment of the present invention. According to a certain embodiment of the present invention, the rental bid is directed to a certain item type. According to a certain other embodiment, the rental bid is specifically directed to a certain (particular) item (e.g., that is, if the user interface allows the user to see a list of (all or some of) rental items for a given rental item type (for example, with photos), etc.). In certain embodiments, the users may be allowed to add comments to particular items (e.g., regarding the condition of a rental item, etc.), depending on their permission/privilege levels, etc. In such embodiments, each item from the same item type may have different point reward/deduction values, etc. The exemplary process shown in the figure further includes an operation 472 for matching and processing offers and bids. Additional operations such as adjusting point values based on rental transaction may also be included. According to a certain embodiment of the present invention, the system goes through the matching process at a regular interval. According to a certain other embodiment of the present invention, matching is sought as soon as a new bid or offer is input into the system.

With reference now to FIG. 11, various exemplary rental processes according to some embodiments of the present invention are shown. Each of the four figures, FIGS. 11A-11D, schematically illustrates a process corresponding to one of the basic operations of a rental system. FIG. 11A shows an exemplary process when a new item becomes available (or, a new offer is made), 482. In this case, if there is already a request/bid for that item type (e.g., in an item request queue, etc.), as indicated by the decision block 484 in the flow chart, the rental process 486 is initiated (or, the rental offer is fulfilled, etc.). Otherwise, the item is put at the end of the corresponding item/offer queue, at 488. In a certain embodiment, the item or the offer may be put into the queue first regardless of whether the item (or item type) is currently requested or not. FIG. 11B shows an exemplary process when there is a new request or a bid, as indicated in block 502, according to an embodiment of the present invention. In this case, depending on the item availability 504, the request either can be fulfilled 506 (e.g., the requested item is rented to the bidder either from the system inventory or directly from the provider (e.g., whose offer is on top of the queue), etc.), or it can be stored in the corresponding request queue 508, e.g., for later processing. In a certain embodiment, the request/bid may always be put into the corresponding queue first regardless of whether an item of the requested type is currently available or not. FIG. 11C shows an exemplary process for "returning" rented items. When the item is returned 522, the item will be normally put back into the item/offer queue 528 (e.g., at the end of the queue) so that it can be rented to other renters. However, if the owner of the item decides to make it no longer available for rent (or, the existing offer is withdrawn, etc.), which will be referred to herein as "recall" in this disclosure, as indicated by a decision block 524, the item will be returned to him or her 526 (or, temporarily taken out of the queue and held in the system, etc.). FIG. 11D shows an exemplary "recall" process. When the item is recalled 542, depending on the item's rental status, it can either be returned to the original provider/owner 548, or it can be simply marked as recall 546. In a certain embodiment of the present invention, items marked as Recall will be returned to the owner as soon as it is returned to the system. One other process that merits a brief mention in this disclosure might be certain miscellaneous operations, for example, when an item is lost or otherwise damaged, in which case the item (or, the corresponding offer) might be taken out of the queue and certain processing (e.g., such as compensating owners with points, etc.) might be performed. This disclosure, however, will not go into all these details elaborating on all relevant issues (e.g., which are not essential in understanding important aspects of the present invention). People of ordinary skill in the art will appreciate what is necessary to fully implement multi-party rental methods and systems that meet their needs, based on teachings of the current disclosure.

Figure 12A:
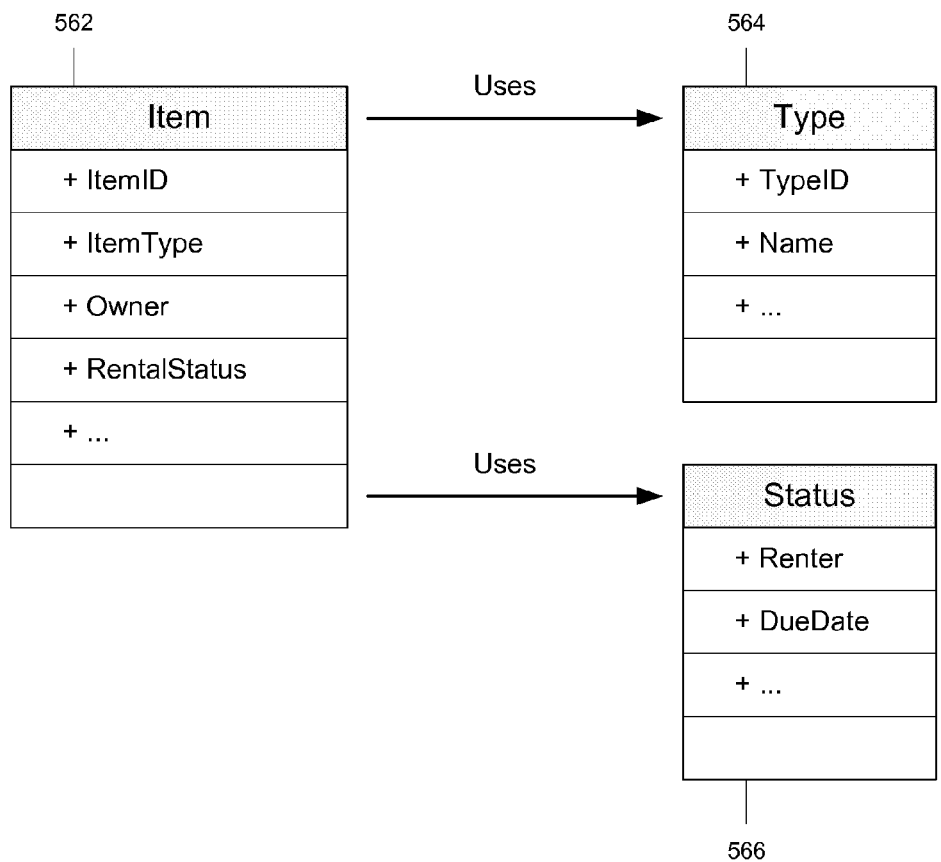
FIG. 12A illustrates exemplary data structures used to represent rental items in a certain embodiment. The figure shows only a few of the essential classes used in an exemplary implementation.
Figure 12B:
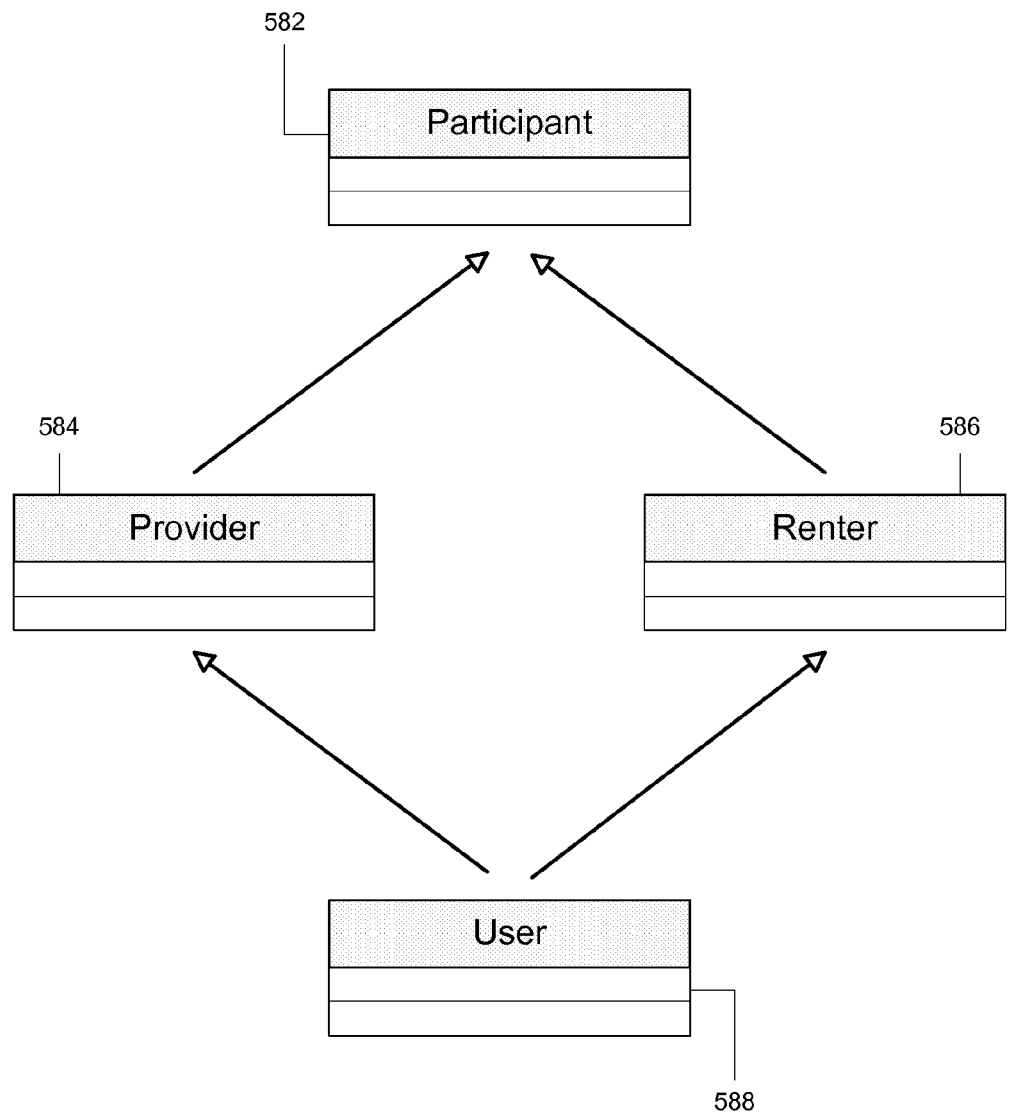
FIG. 12B illustrates an exemplary inheritance hierarchy among various classes representing users of a multi-party rental system according to an embodiment of the present invention. The class, Participant, shown at the top is used as a base class for other three classes corresponding to the three different user types supported by the system.

Now turning to (simplified) UML class diagrams shown in FIG. 12, FIG. 12A illustrates internal data structures used to represent rental items in an embodiment of the present invention. The figure shows only a few of the essential classes used in an exemplary implementation, namely, the Item class 562 representing the item exchanged on the system, and the Type class 564 representing the (standardized) item type, and the Status class 566 representing the item's availability and the current rental record. FIG. 12B shows an exemplary design of users/participants of the system according to an embodiment of the present invention. As stated earlier, the user can either be only a provider 584 or only a (potential) renter 586. In general, however, users will have both privileges 588, as indicated by the inheritance relationship, such as in the case of rental club or rental community. The class 582 in the figure is used as a base class for implementing common functionalities in this particular design.

Figure 13:
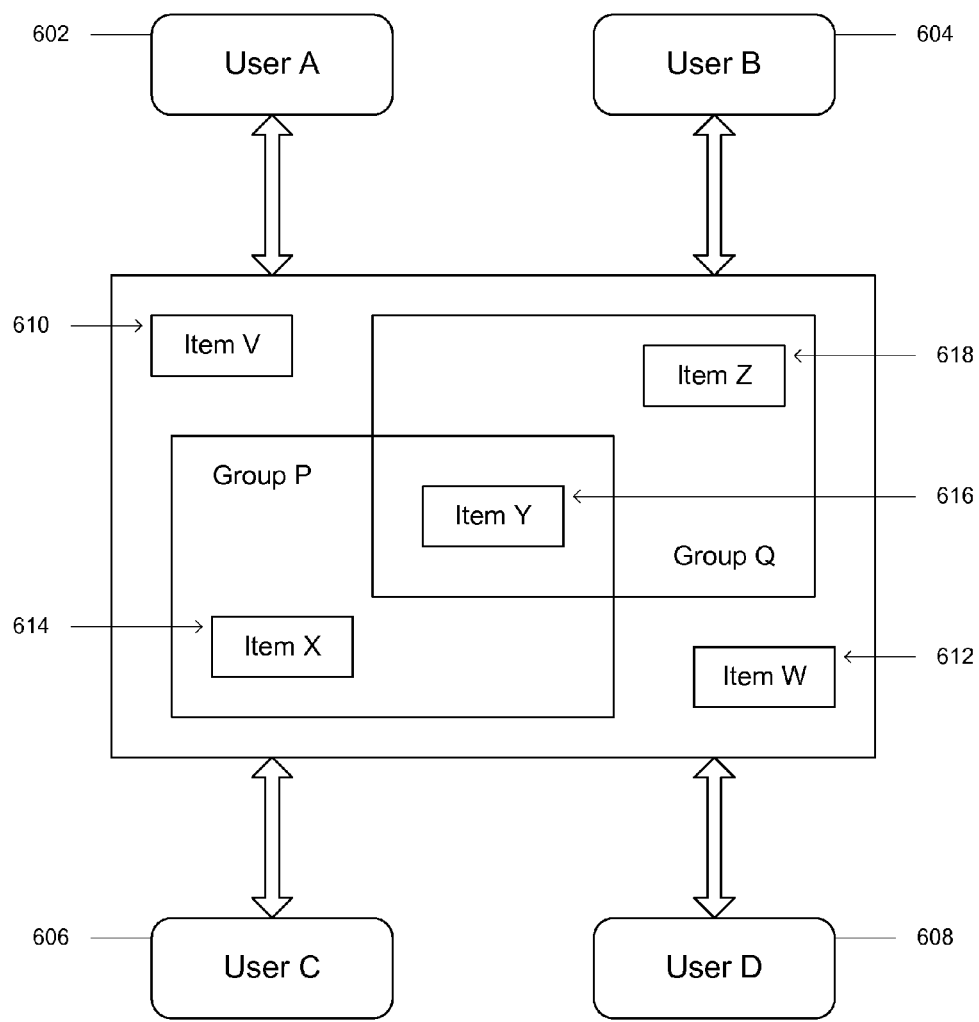
FIG. 13 illustrates an exemplary access control mechanism implemented for four users and five items. Items or users belong to one or more groups (e.g., classes, communities, etc.) in certain embodiments of the present invention.

As alluded earlier, and as illustrated in FIG. 13, different access levels can be implemented for different user groups/ communities and/or for different item types/classes. For example, a user might belong to an "X-company community" and decides to rent some of his items only to the people who belong to this group/community, and allows for the rest of his items to be rented by all registered users on the system. With regards to the figure, involving four users, 602, 604, 606, and 608, and five items, 610, 612, 614, 616, and 618, if the following exemplary access control is implemented:

User A: access granted to all items,
User B: access granted to all items except those in Group Q,
User C: access granted only to items in Group P, and
User D: access granted to none.

Then, the following would hold:

User A: access granted to items V, W, X, Y, and Z,
User B: access granted to items V, W, X, and Y,
User C: access granted to items X and Y, and
User D: access granted to none.

According to an embodiment of the present invention, access control is managed by an individual user, by a group administer, and/or by a system administer, etc.

In general, items or item types can be classified into (overlapping) multiple groups, and users can be classified into (overlapping) multiple communities. Each community, just like each individual user, can be categorized into Provider-type, Renter-type, and both. When a user belongs to multiple categories or groups, a precedence rule may need to be defined. The access controls are set by giving each community a permission regarding to each group in certain embodiments of the present invention. Designing permission levels/access controls, generally known as authentication and authorization, is a well-established subject in software engineering, and a person of ordinary skill in this art will not have problems designing this aspect of a rental system, based on the teachings of the current disclosure. According to an embodiment of the present invention, a user is given an access (e.g., a right to view a certain item in a listing, a right to make a bid, etc.) if he belongs to at least one community which is granted the corresponding access.

Figure 14:
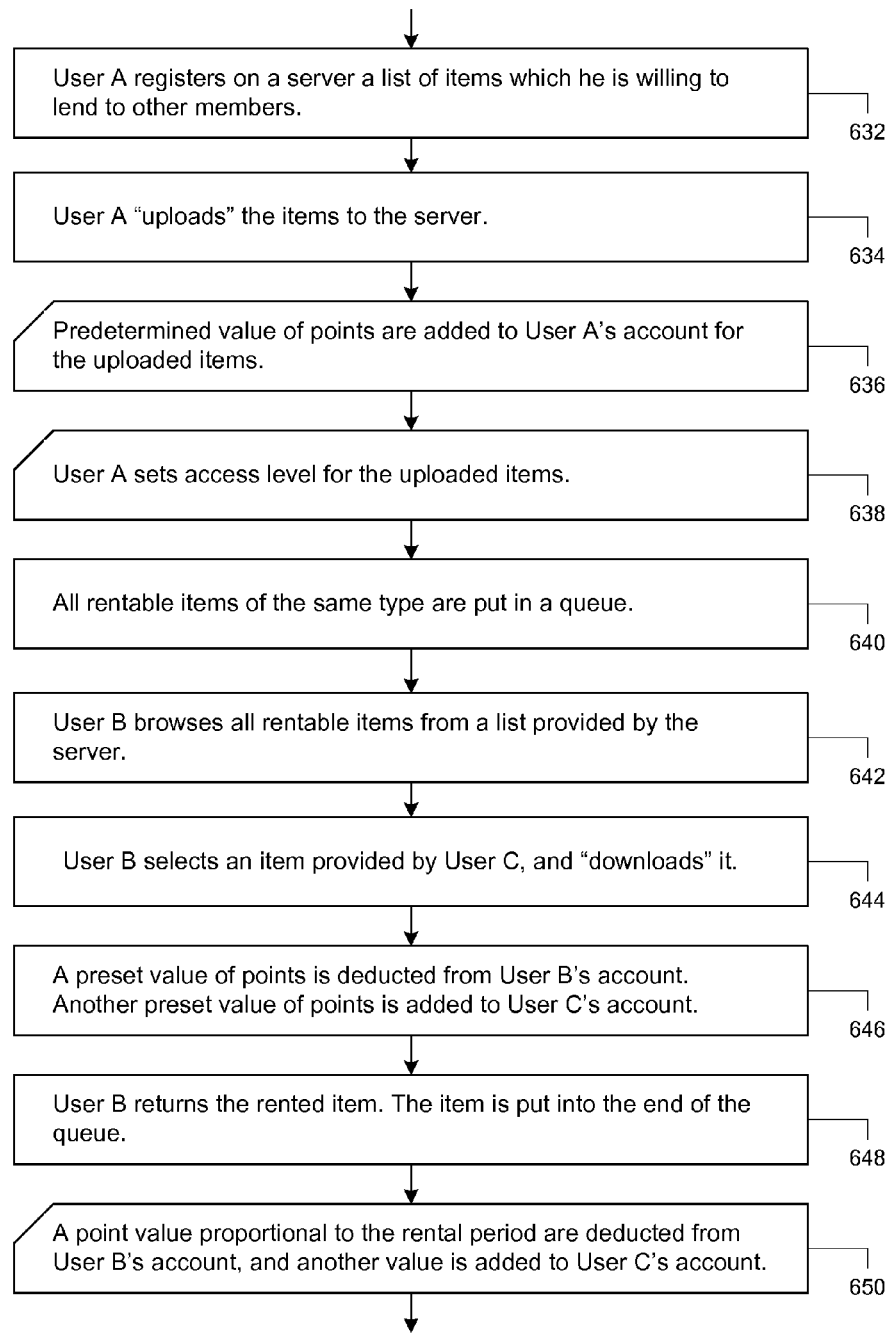
FIG. 14 shows an exemplary scenario illustrating certain basic operations in a certain embodiment of the present invention. The blocks with cut corners represent optional operations in this particular embodiment. The figure shows two related processes in one flow char, User A uploading an item, and User B renting an item provided by User C.

An exemplary rental scenario in an embodiment of the present invention is shown in FIG. 14, which comprises ten blocks, from 632 to 650. Blocks with cut corners represent optional operations in this embodiment.

Block 632: User A registers a list of items which he is willing to rent to other people.

Block 634: User A "uploads" the items to the server. The items can be sent to the server subsequently or it can be done "on-demand", as stated earlier.

Block 636: (Optional) A fixed values of points are added for the uploaded items.

Block 638: (Optional) He sets access controls for the uploaded items, for example, by making certain items "public" or "rentable", or "private". In a certain embodiment, all uploaded items can be made Public (or Private) by default.

Block 640: All rentable items of the same type are put in a queue on a first-in-first-out basis. For example, all DVDs of the same title and format (and, in a specified condition/quality, etc.), e.g., "The Godfather; Collector's Edition; Widescreen format; (in Fair condition)", will be put in the same queue.

Block 642: User B browses all rentable items from a list provided by the server (e.g., based on his privilege level, etc.).

Block 644: She selects an item and "downloads" it (e.g., the server sends it to her through a postal service). It is supposed that the rented item happens to be the one owned by User C.

Block 646: A fixed value of points is deducted from User B's account. And a fixed value of points is added to User C. These two points need not be equal to each other. In a certain embodiment, the point difference (or, point spread) is used to retain certain values in the system (e.g., as a fee for using the system, etc.).

Block 648: User B returns the rented item, which is put into the end of the queue.

Block 650: (Optional) Points proportional to the rental period can be deducted from User B's account and/or added to User A's account.

Figure 15:
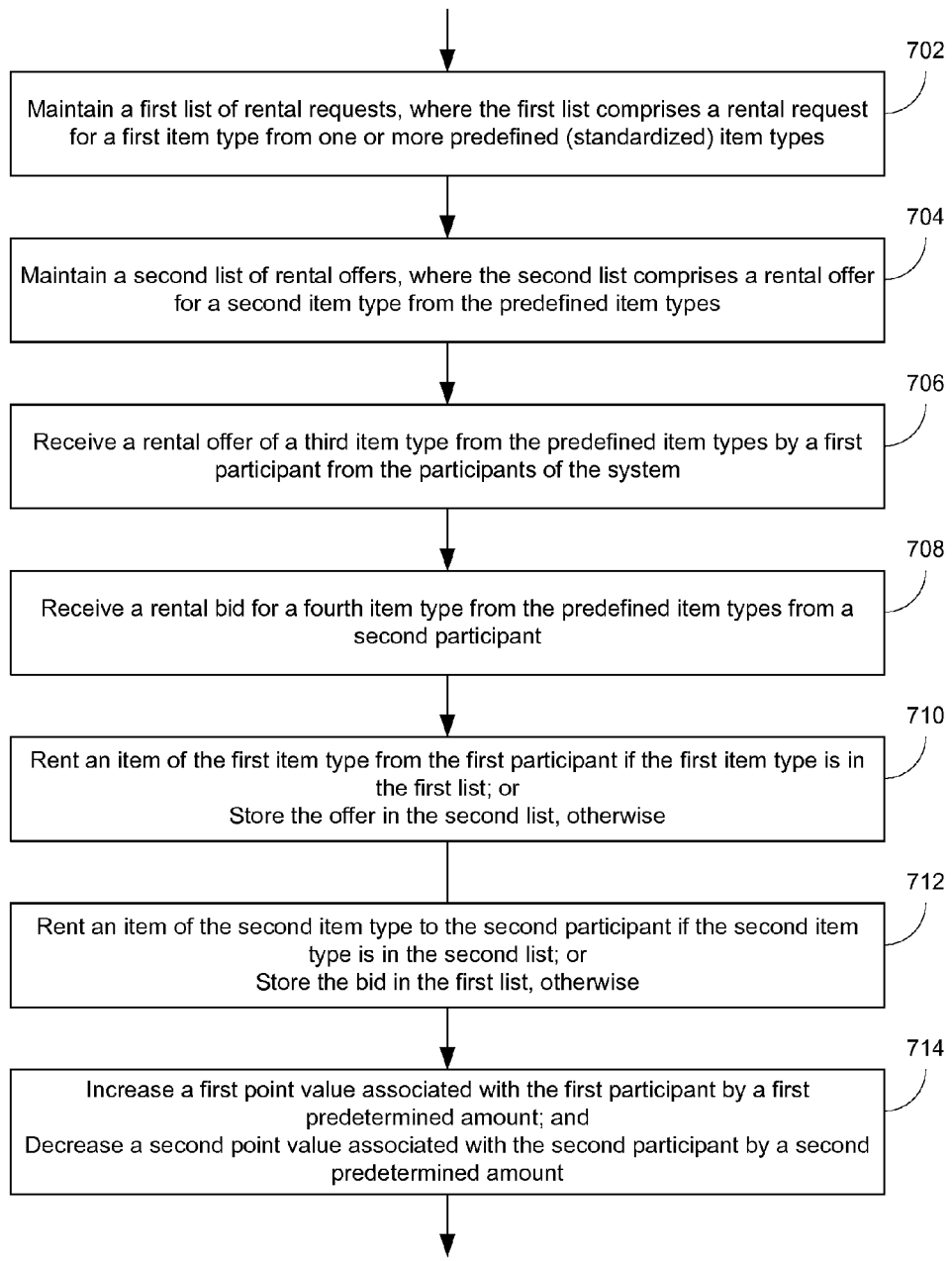
FIG. 15 depicts a flow chart illustrating an exemplary rental method according to an embodiment of the present invention.

FIG. 15 shows another flow chart illustrating an exemplary rental method according to an embodiment of the present invention. The exemplary system illustrated in the flow chart maintains a first list of rental requests and a second list of rental offers, as indicated in blocks 702 and 704. The first list includes a rental request for a first item type from one or more predefined item types and the second list includes a rental offer for a second item type from the predefined item types. In a certain embodiment, the item types are "standardized" as explained earlier. In a certain other embodiment, the offered items of a given item type are individually listed (e.g., presented to potential renters, etc.) so that a renter can select a particular item to rent (e.g., based on its condition, comments of other users, etc.) if he or she chooses to do so. At block 706, the server receives a rental offer of a third item type from the predefined item types by a first participant of the system, and at block 708, it receives a rental bid for a fourth item type from the predefined item types from a second participant. Next, at 710, an item of the first item type from the first participant is rented, or the rental offer is otherwise fulfilled, if the first item type is in the first list (e.g., it has been requested). Otherwise, the offer is stored in the second list (e.g., for later processing, etc.). At 712, an item of the second item type is rented to the second participant, or the rental bid is otherwise fulfilled, if the second item type is in the second list. Otherwise, the bid is stored in the first list (e.g., for later fulfillment, etc.). When, the items are rented, a point value associated with the first participant is increased by a first predetermined amount and/or a point value associated with the second participant is decreased by a second predetermined amount, as indicated in block 714. In some embodiments of the present invention, the first predetermined point amount is smaller than the second predetermined point amount when the same item is rented from the first participant to the second participant.

In some embodiments of the present invention, special software component (e.g., not unlike market makers commonly used, for example, in stock exchanges, etc.) can be used to facilitate rental processes. By maintaining special inventories (e.g., items additional to those offered by participants, etc.), for instance, the system or market makers can increase the liquidity of the system. The system can also handle more complex request types, such as a reservation at a certain future time period, or rental items with some complex constraints. For example, certain items may be rented with the provision that the item needs to be returned during a certain time period (e.g., similar to having a "blackout period", etc.). This type rental constraint can be used, for example, renting out vacation homes. The owner might want to use the place, say, during the summer season, and rent it out for the rest of the year.

Even though the present invention has been explained in the context of tangible goods such as automobiles or DVDs, certain embodiments can also be used for "renting" services or labors. Renting, in this context, means providing a certain service with the promise that the same or similar (or, otherwise commensurate) service will be returned. Systems matching car pool drivers and riders can also be implemented using this type of rental service. In this case, the item types are defined by the areas/neighborhoods where people commute from and/or to (and/or the commute hours, etc.). The rental "item" comprises a car availability and willingness to drive and take other people, etc. The more frequently you drive, the more "currency" you earn which allows you to get a "free ride" (or, discounted ride) to work (or, or for a longer ride between different cities, etc.). This system precludes the necessity to have carpooling "teams", as is currently used in most carpooling arrangements, which people need to stick to for a certain period of time. It can also be extended to occasional travel/trip ride sharing for a longer distance, for example. System for renting digital media can also be implemented using an embodiment of the present invention. In this case, some inventory management routines may be simplified since only one item from the same item type needs to be maintained by the system (e.g., a copy of the digital media). In certain embodiments for renting digital media, the number of simultaneous rentals may be kept under a certain (possibly dynamic) value, e.g., to satisfy licensing requirements. For example, when the current number of "rental" offers is five for a certain movie title in a downloadable format, the movie may only be downloaded (e.g., rented) by no more than five users at any given moment.

Systems which utilize auction-type of trading can also be implemented according to certain embodiments of the present invention. The providers and renters can decide on how much point or value they are willing to exchange/trade for particular items (and, for particular periods, etc.), e.g., through auction processes. (It should be noted that rental transaction, according to an embodiment of the present invention, generally requires slightly more complicated "price" formula or rule, for example, as illustrated in FIG. 3.) Even though this will make it harder to find matching parties, this can be useful for large systems with relatively smaller number of item types, such as mutual (or, community-based) car rental systems. As stated earlier, market makers may be used to increase liquidity in certain auction-type embodiments of the present invention. In certain cases, the current rental prices (e.g., point values for offers and bids for each standardized item type, etc.) may be dynamically provided. According to an embodiment of the present invention, offers/bids may be placed at least in one of the forms of a limit order, stop order, or stop-limit order. For example, a limit order type rental offer may be an offer for renting out a certain item in exchange for point values equal to or greater than a preset value (or, a set of preset values, etc.). Even on systems with otherwise fixed point value policies, these values can be dynamically changed depending on the supply and demand balance. For example, newly released DVD movies will be generally in higher demand, and the system can reflect this by using higher point values for those items (e.g., for the provider and/or for the renter). Some users might also want to pay (certain predetermined) higher point values or premiums to go "in front of the line". This type of expedited renting can also be included in multi-party rental methods, systems, or apparatuses according to certain embodiments of the present invention.

Figure 16A:
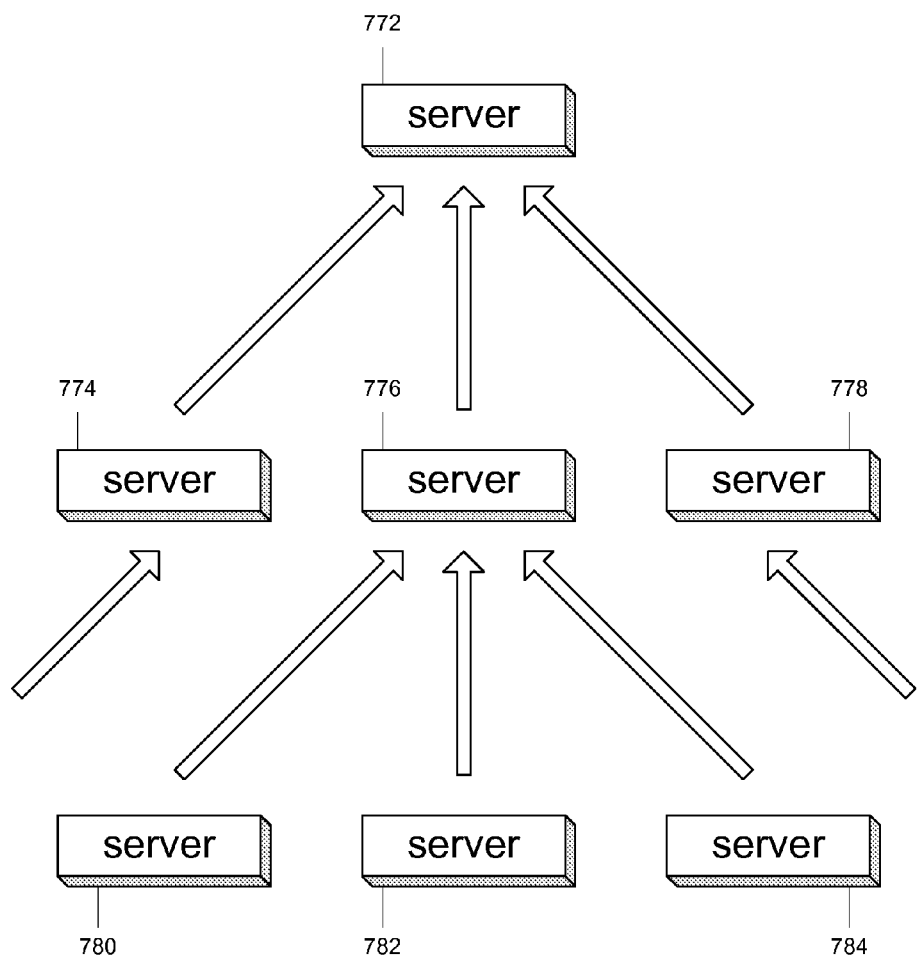
FIG. 16A shows an exemplary multi-server organization based on a DNS-like scheme according to an embodiment of the present invention. The servers at different levels might play different roles in this scheme.

One other generalization worth mentioning is using multiple servers. In one embodiment of the present invention shown in FIG. 16A, the servers, 772 through 784, are arranged in hierarchical manner. This arrangement can reflect geographical proximities or other organizational groupings. Users associated with, for example, the server 782 might exchange/swap items with only users who belong to the same server, or the range can be extended to the higher-level including servers 776, 780, 782, and 784, as shown in the figure. This limitation in the range can be imposed by the system or it can be optional and left to the user's discretion. According to an embodiment of the present invention, the servers share the same (dynamic) data (e.g., regarding rental offers/requests, currently available/rentable items, user account/membership information, etc.), for example, using a common database(s) and inventory(s).

Figure 16B:
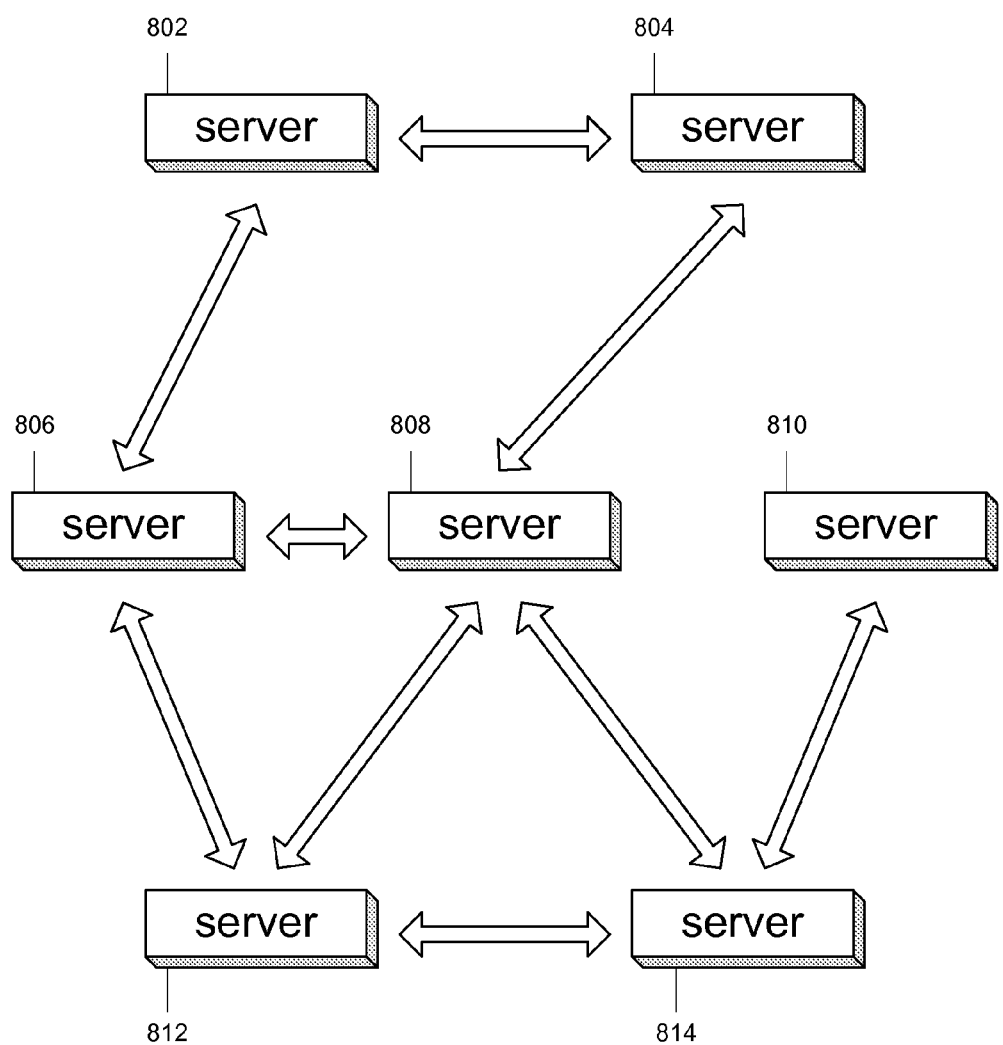
FIG. 16B shows another exemplary multi-server organization which follows a peer-to-peer paradigm. The distance between servers are measured by "hops" in this embodiment.

FIG. 16B shows peer-to-peer type arrangement of servers, indicated with labels 802 through 814 in the figure, according to another embodiment of the present invention. In this embodiment, the number of "hops" (or, degrees of separation) between servers will be used to limit access to items available in other servers (that is, if that type of access control is needed). Again, this arrangement can be a reflection of geographical distances between the servers, which can be rather important in the case of, for example, automobile renting. In the figure, the distance between servers 808 and 814 is 1 hop, whereas the distance between servers 802 and 814 is 3 hops. In some embodiments of the present invention, "asymmetric" coupling may also be possible. For example, a user who belongs to server 814 may be able to rent items from server 810, but a user who belong to server 810 may not have permission to rent items from server 814.

Thus the reader will see that, according to the invention, methods and apparatuses for coordinating item or service rentals between multiple parties have been provided. While the above description contains many specificities, these should not be construed as limitations on the scope of the invention, but as exemplifications of the presently preferred embodiments thereof. Many other ramifications and variations are possible within the teachings of the invention. For example, in a certain embodiment, rental bidding might allow for "substitutes": A user prefers to rent a certain type of car which is in an "excellent condition", but he or she may still be willing to rent a car in a "good condition", if his or her choice is not available. As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable storage medium may be utilized including hard disks, CD-ROMs, DVD-ROMs, optical storage devices, or magnetic storage devices. Thus the scope of the invention should be determined by the appended claims and their legal equivalents, and not by the examples given.

What is claimed is:

1. A method for rental of items among a plurality of participants, each item belonging to one of a plurality of standardized item types, the method implemented on a data processing system, the method comprising:

maintaining, on the data processing system, a first list of rental requests, said first list comprising a rental request, by a first participant from the plurality of participants, for a first item type from the plurality of standardized item types;

maintaining, on the data processing system, a second list of rental offers, said second list comprising a rental offer, by a second participant from the plurality of participants, for a second item type from the plurality of standardized item types;

receiving, by the data processing system, an offer to rent out an item of a third item type from the plurality of standardized item types by a third participant from the plurality of participants; and automatically matching said offer to rent with said rental request in said first list if a first condition is satisfied, wherein said first condition comprises said first item type being the same as said third item type, whereby an item rental process, if said matching is successful, is automatically initiated, by the data processing system, between said first participant and said third participant.

2. The method of claim 1, further comprising:

receiving, by the data processing system, a request to rent an item of a fourth item type from the plurality of standardized item types from said third participant; and automatically matching said request to rent with said rental offer in said second list if a second condition is satisfied, wherein said second condition comprises said second item type being the same as said fourth item type.

3. The method of claim 2, further comprising:

decreasing a point value associated with said third participant by a predetermined amount.

4. The method of claim 1, wherein:

said first list comprises a first queue data structure and said second list comprises a second queue data structure.

5. The method of claim 1, further comprising:

storing, at least temporarily, said offer to rent in said second list of rental offers.

6. The method of claim 1, further comprising:

increasing, based on said automatic matching, a point value associated with said third participant by a predetermined amount.

7. The method of claim 1, further comprising:

automatically matching said rental request with said rental offer if a third condition is satisfied, wherein said third condition comprises said first item type being the same as said second item type.

8. A data processing system for facilitating rental of items among a plurality of participants, each item being one of a plurality of standardized item types, the data processing system comprising:

a processor; and a memory coupled with said processor, said memory having contained therein sequences of instructions which, when executed by said processor, cause said processor to perform a method, the method comprising:

maintaining a list of participants from the plurality of participants, said list including a first participant, said list including a second participant, wherein said first participant is different from said second participant;

maintaining a first list of rental requests, said first list comprising a rental request, by said first participant, for a first item type from the plurality of standardized item types;

maintaining a second list of rental offers, said second list comprising a rental offer, by said first participant, for a second item type from the plurality of standardized item types;

receiving a request to rent an item of a third item type from the plurality of standardized item types from said second participant; and automatically matching said request to rent with said rental offer in said second list if a first condition is satisfied, wherein said first condition comprises said second item type being the same as said third item type, whereby an item rental process, if said matching is successful, is automatically initiated between said first participant and said second participant.

9. The data processing system of claim 8, wherein the method further comprises:

storing, at least temporarily, said request to rent in said first list of rental requests.

10. The data processing system of claim 8, wherein the method further comprises:

adjusting, based on said matching, a first point value associated with said first participant; and adjusting, based on said matching, a second point value associated with said second participant.

11. The data processing system of claim 8, wherein the method further comprises:

receiving an offer to rent out an item of a fourth item type from the plurality of standardized item types by a third participant from the plurality of participants; and automatically matching said offer to rent with said rental request in said first list if a second condition is satisfied, wherein said second condition comprises said first item type being the same as said fourth item type.

12. The data processing system of claim 8, wherein the method further comprises:

enabling said second participant to receive an item of said third item type directly from said first participant.

* * * * *